Dec. 23, 1941.  C. BARBIERI  2,266,948
MACHINE FOR AND METHOD OF MAKING CONTAINERS
Filed June 6, 1940    20 Sheets-Sheet 1
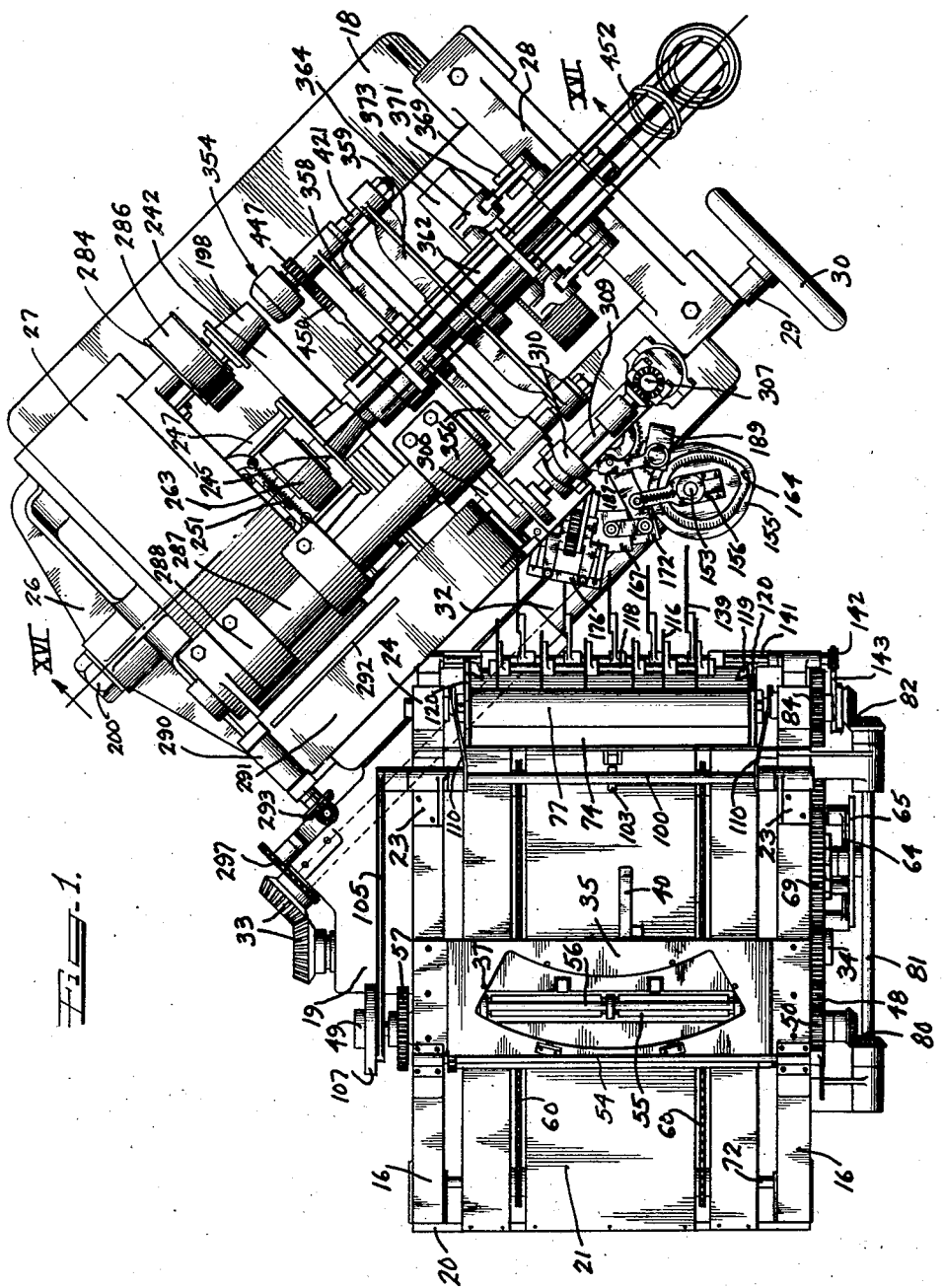

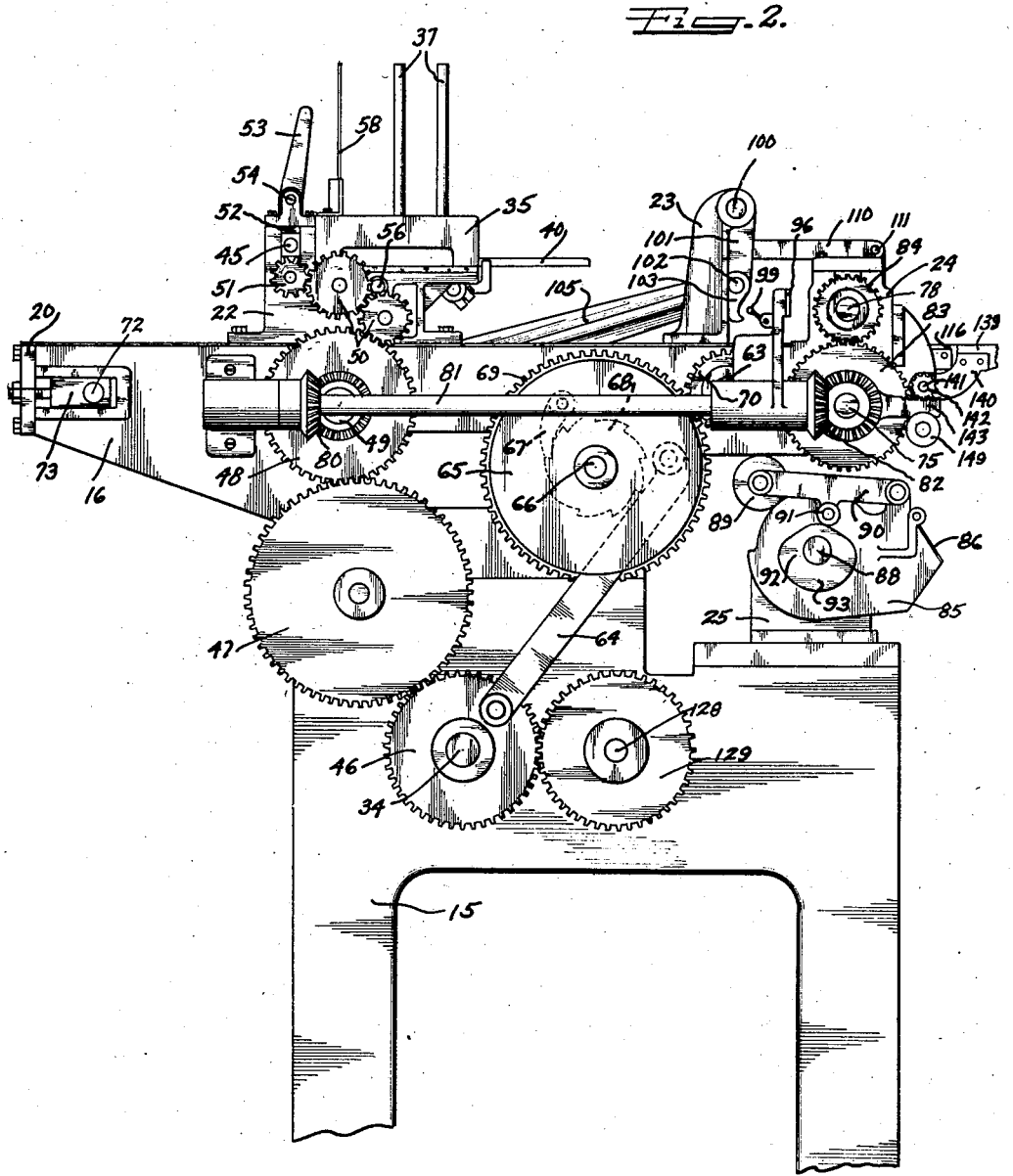

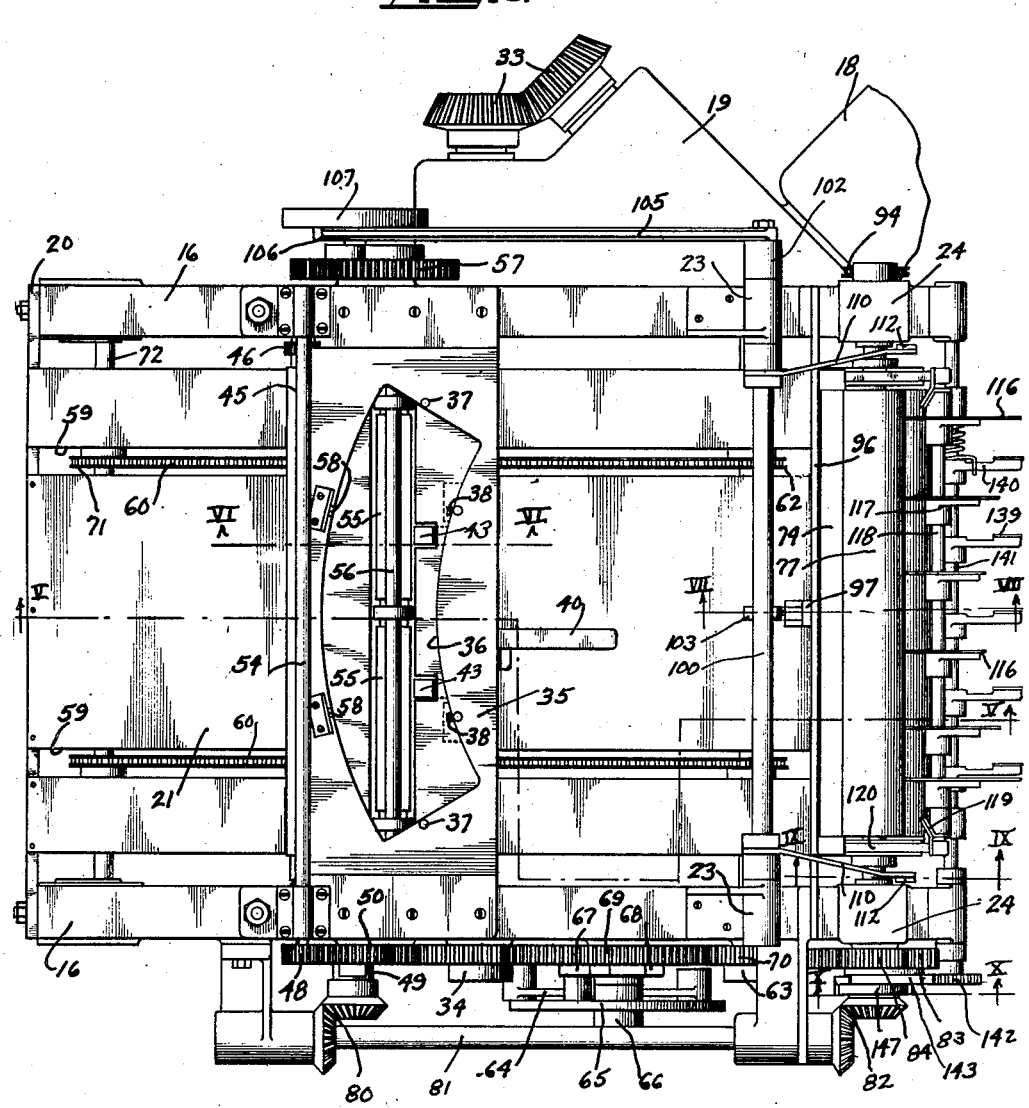

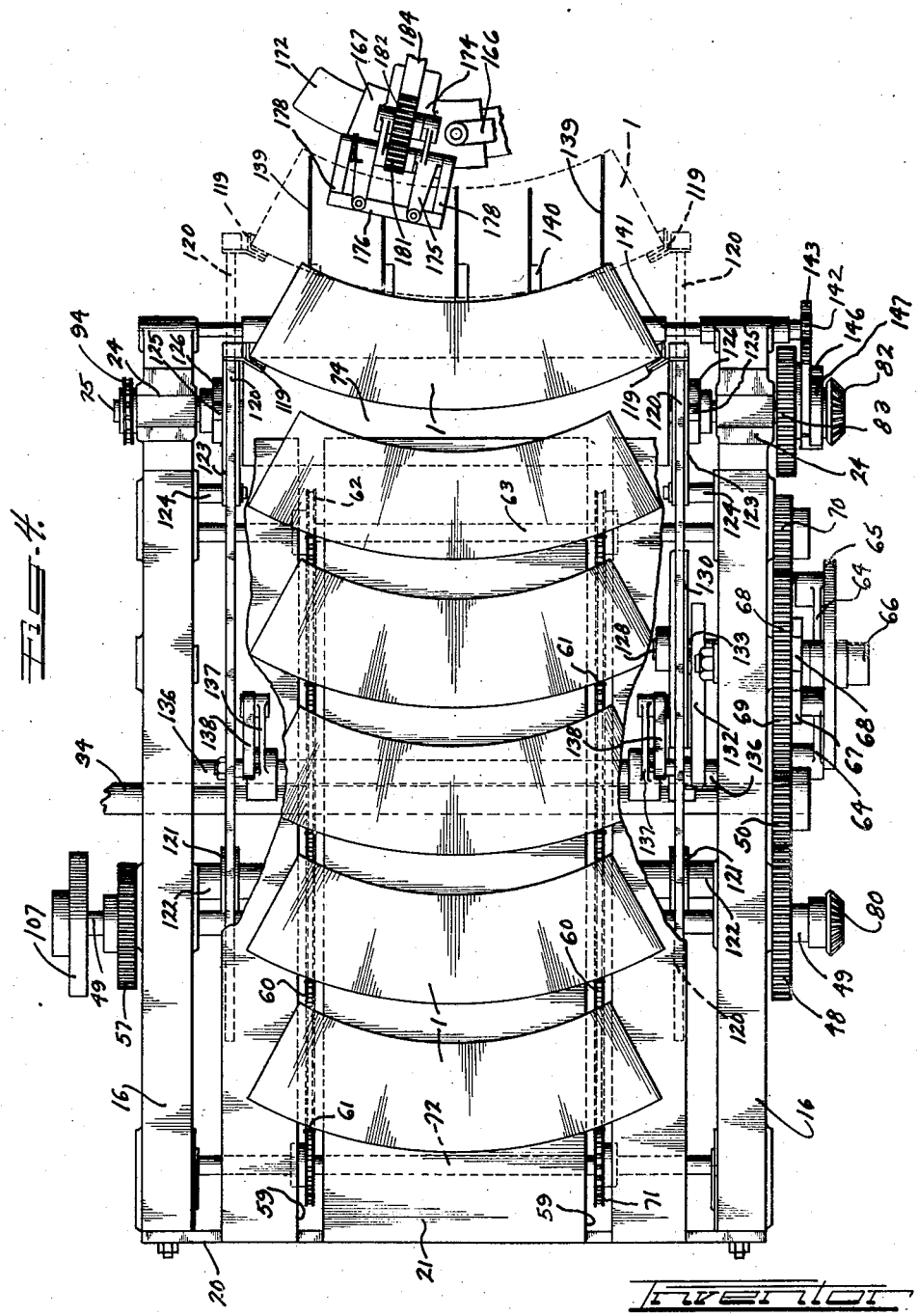

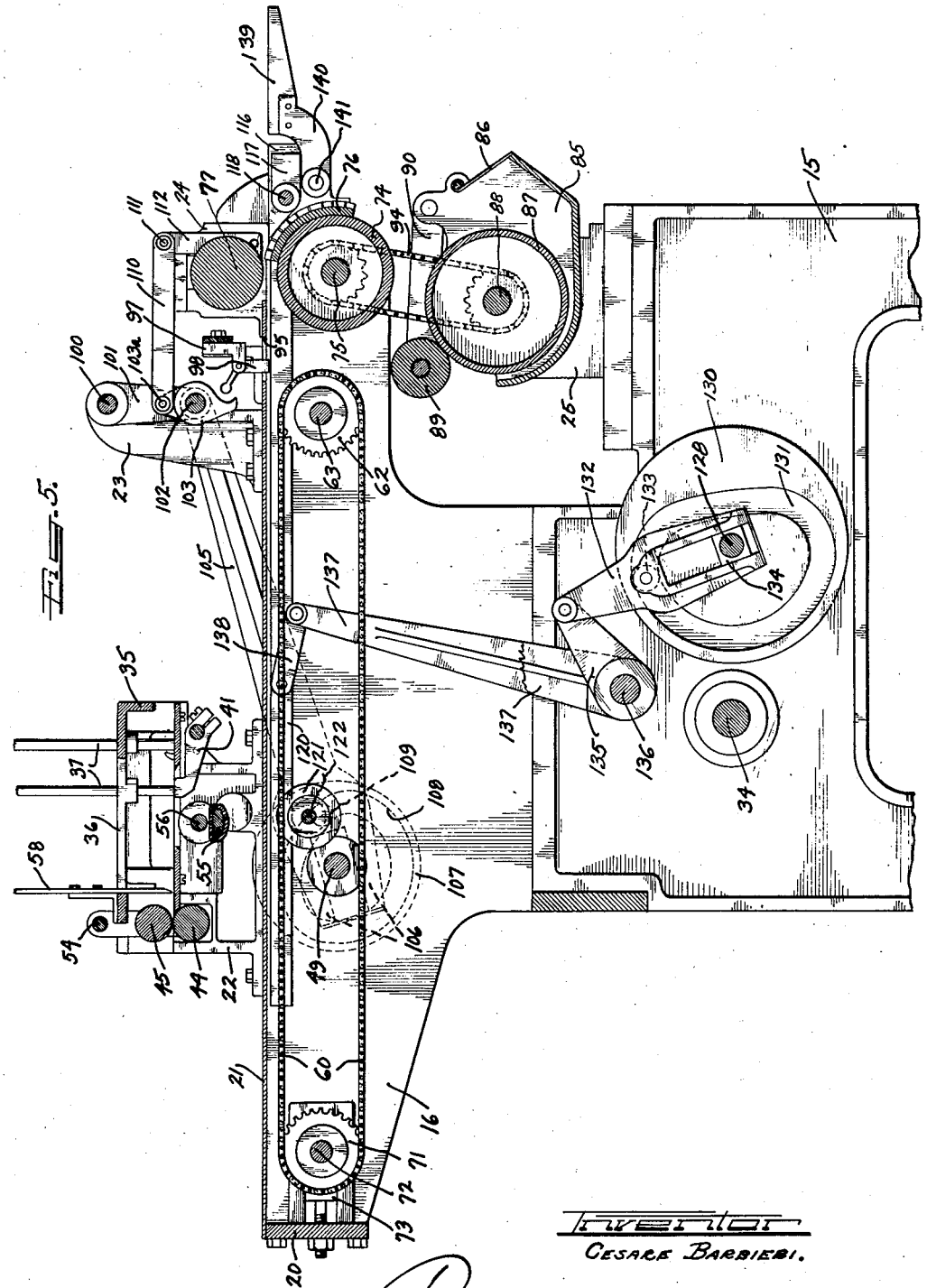

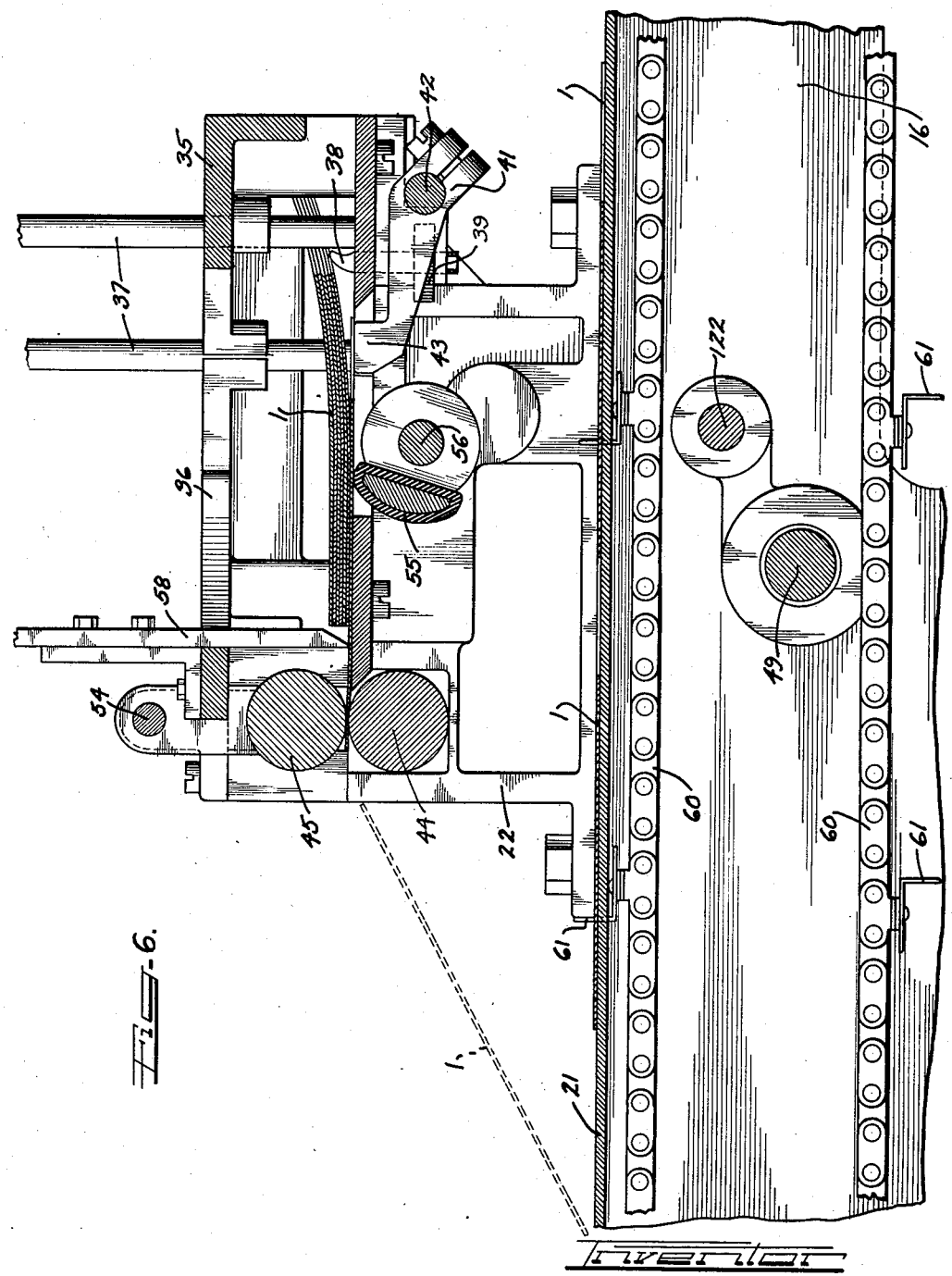

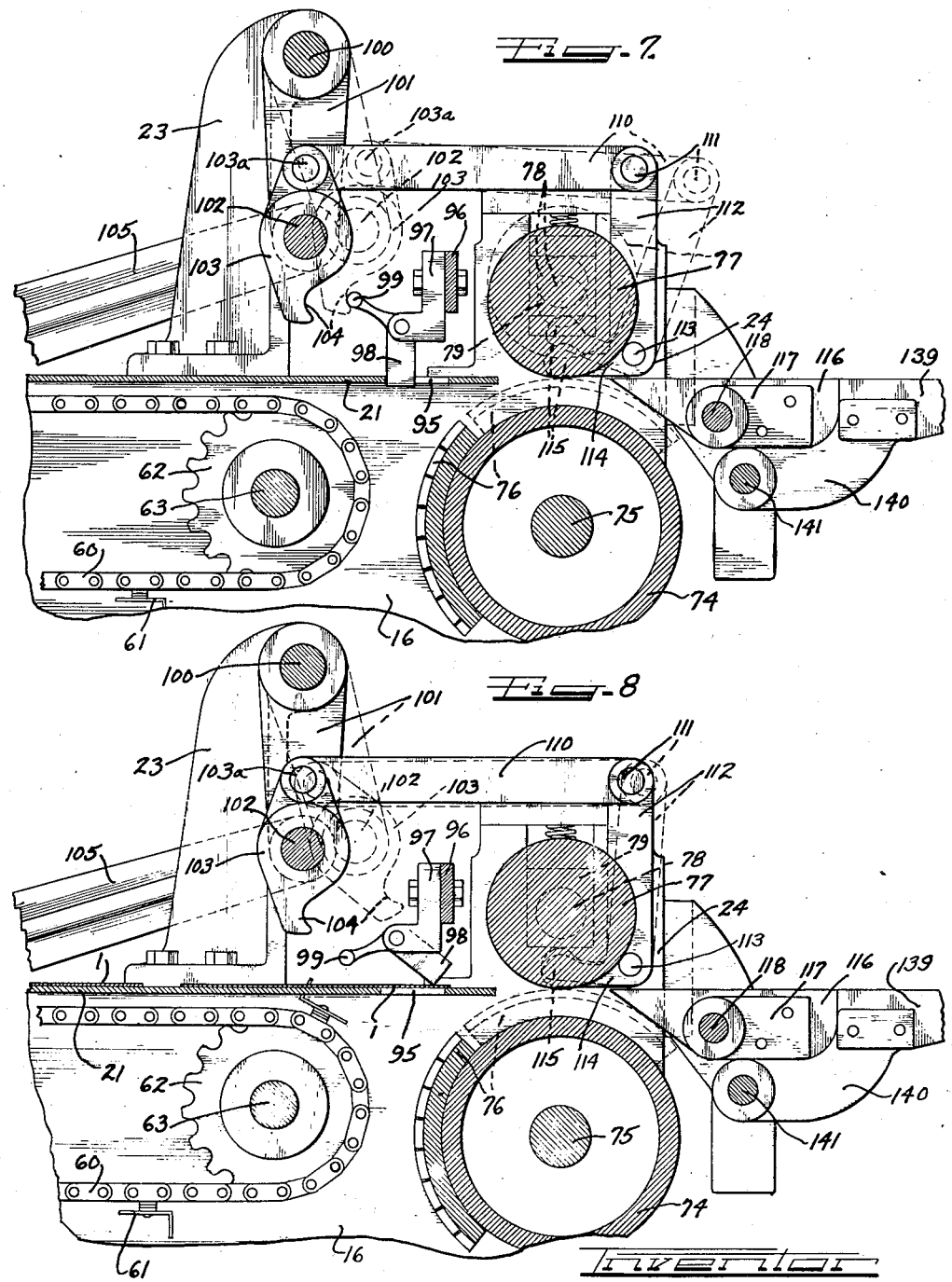

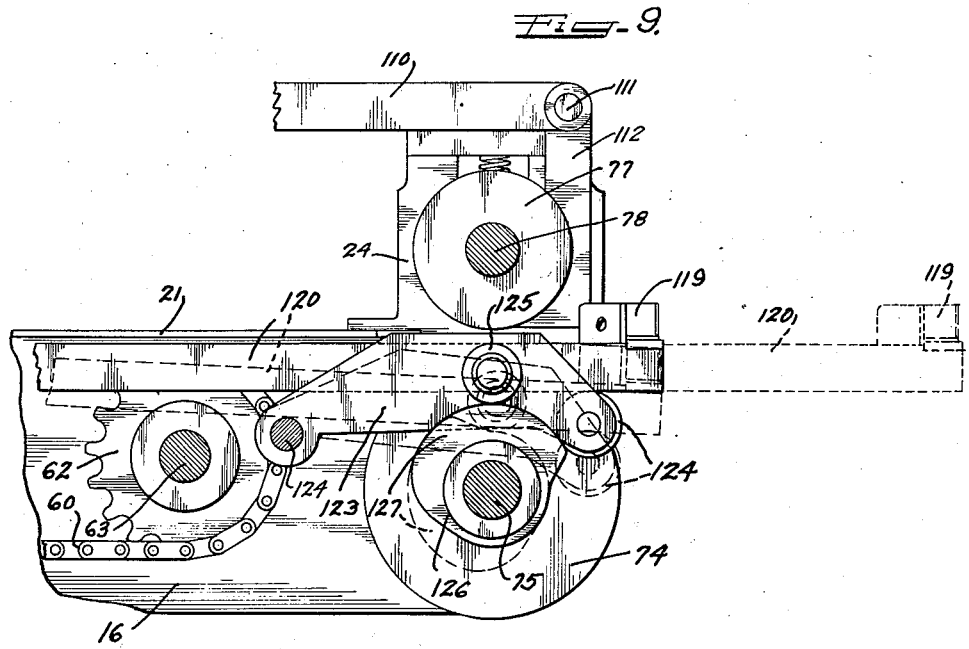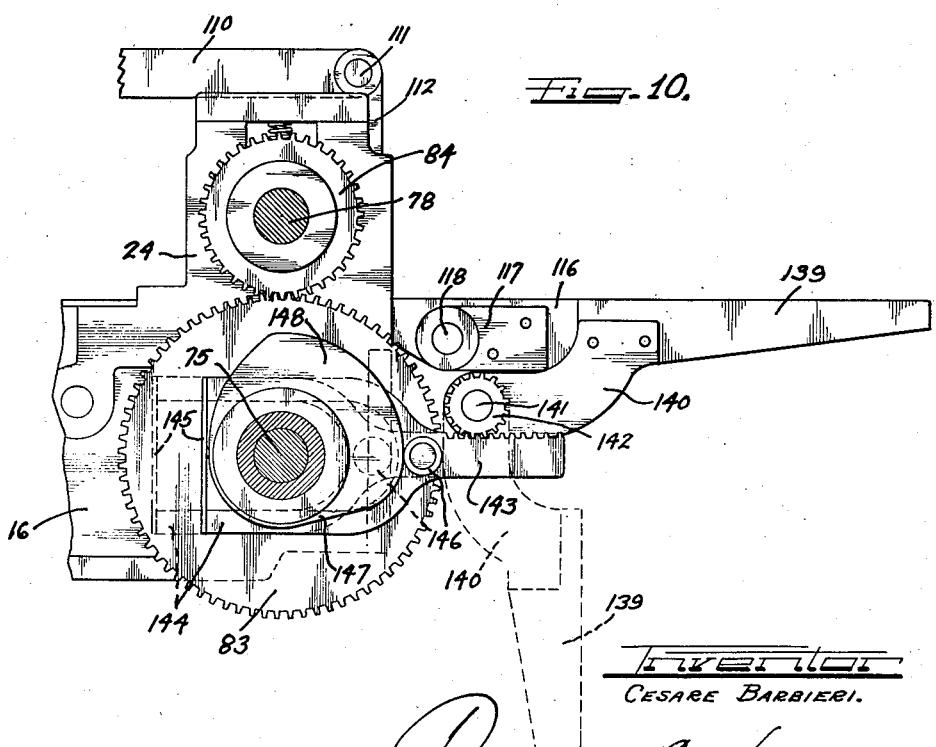

Dec. 23, 1941.   C. BARBIERI   2,266,948
MACHINE FOR AND METHOD OF MAKING CONTAINERS
Filed June 6, 1940   20 Sheets-Sheet 9
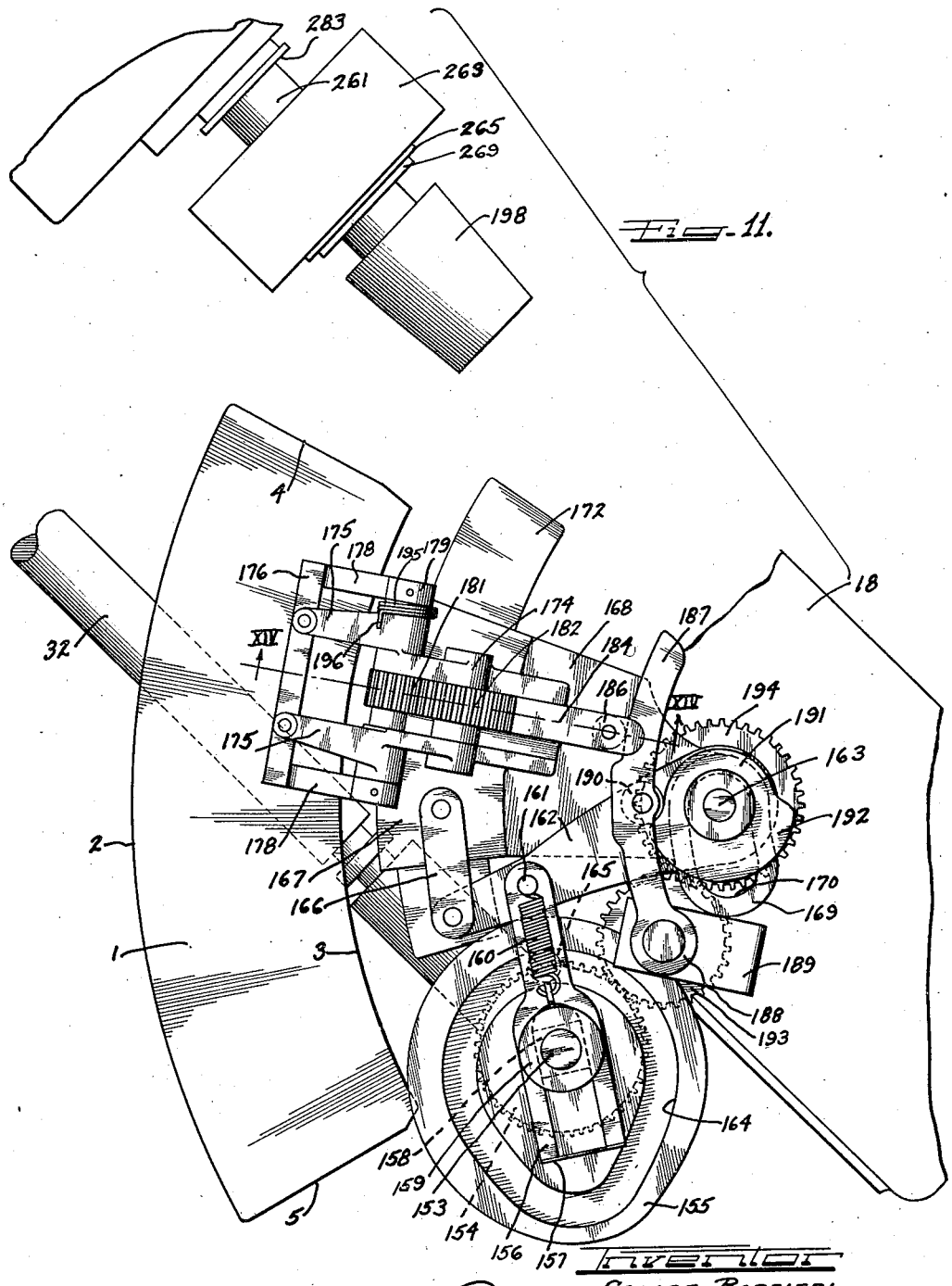

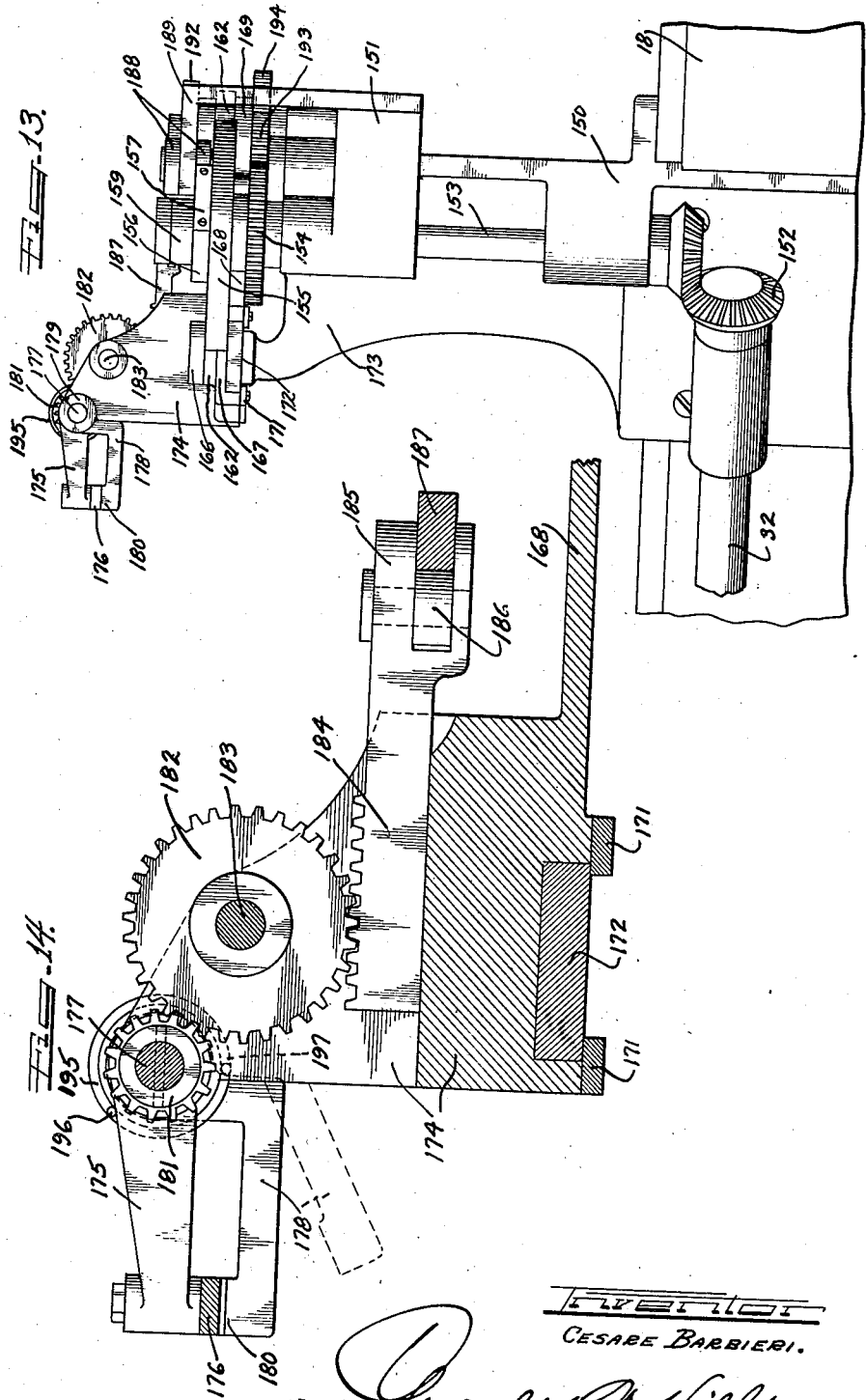

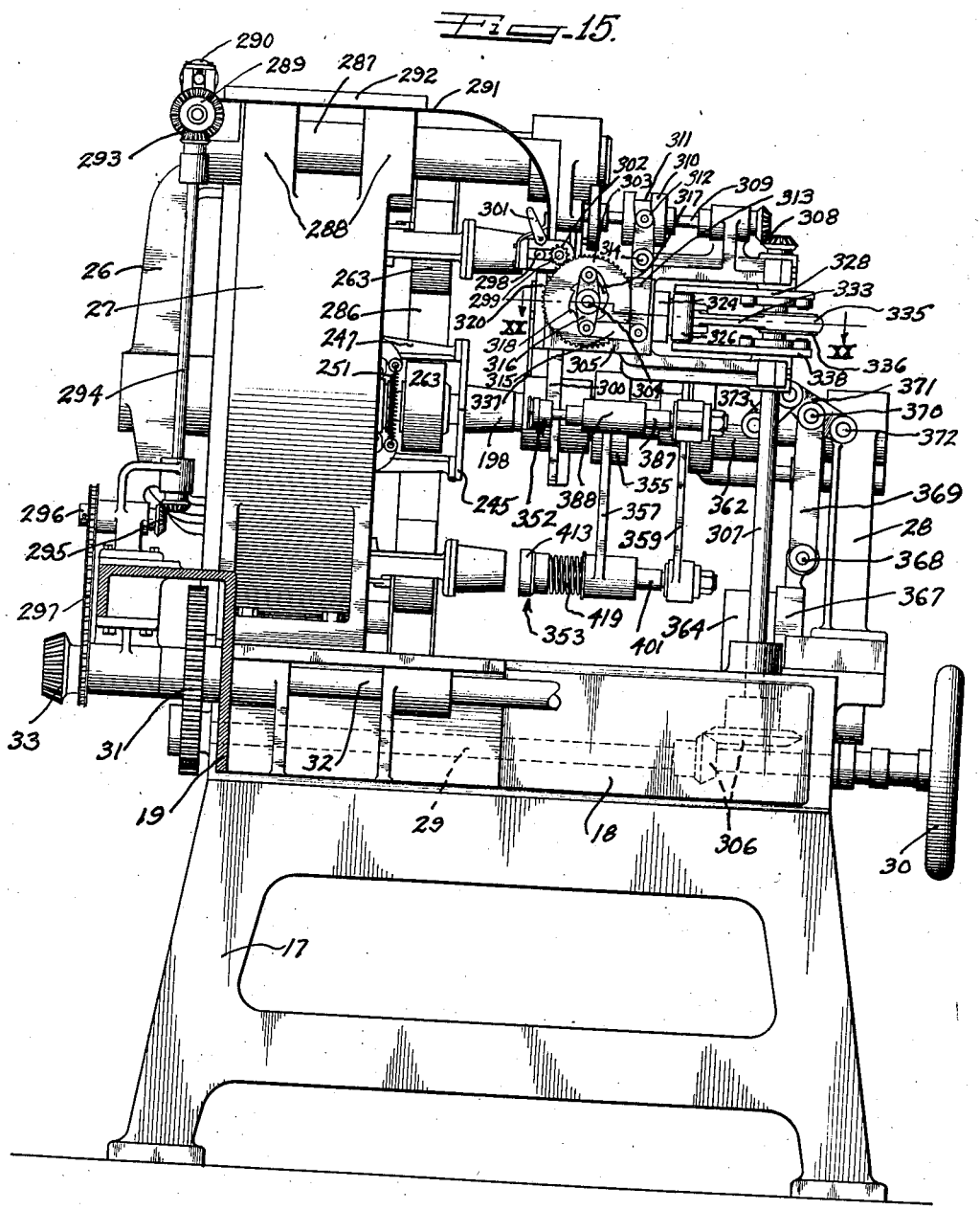

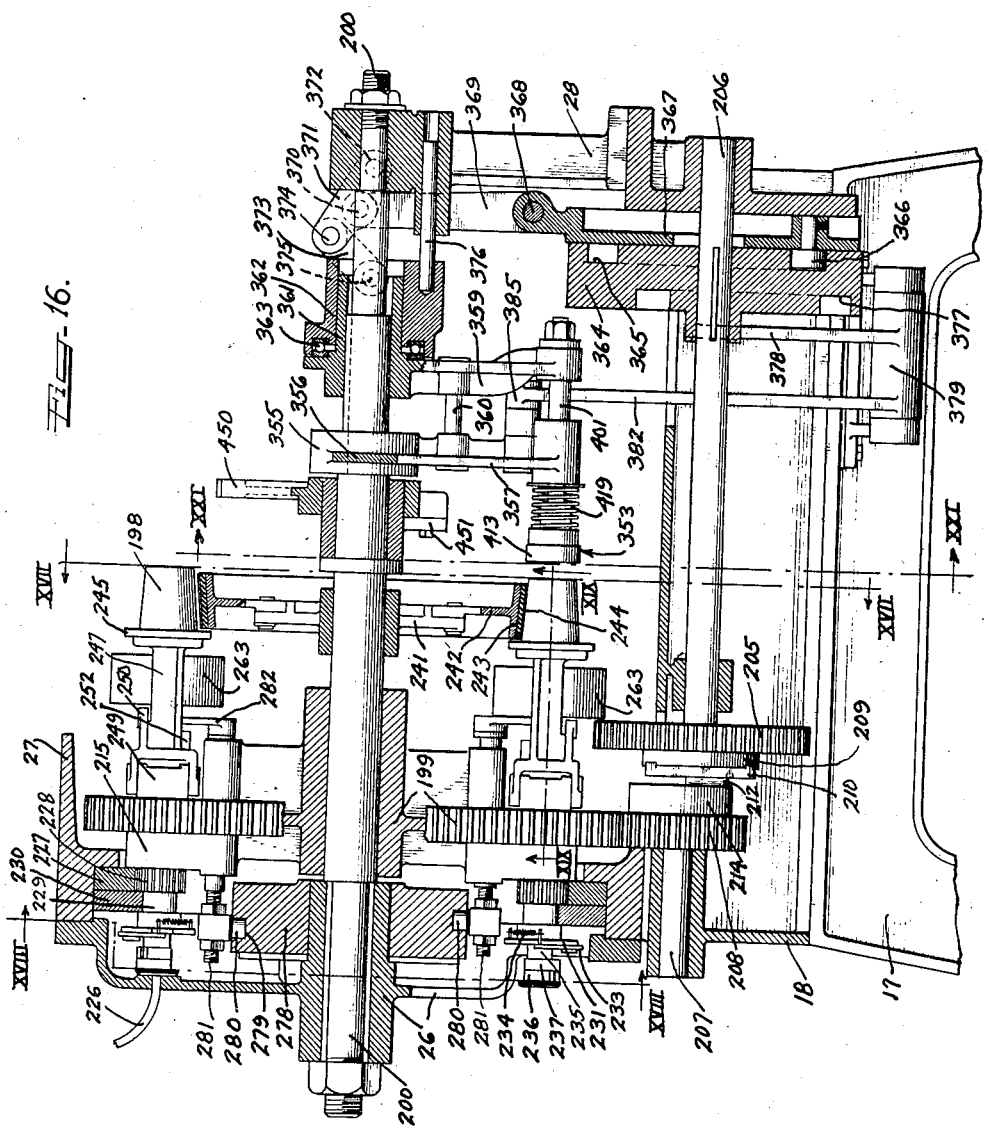

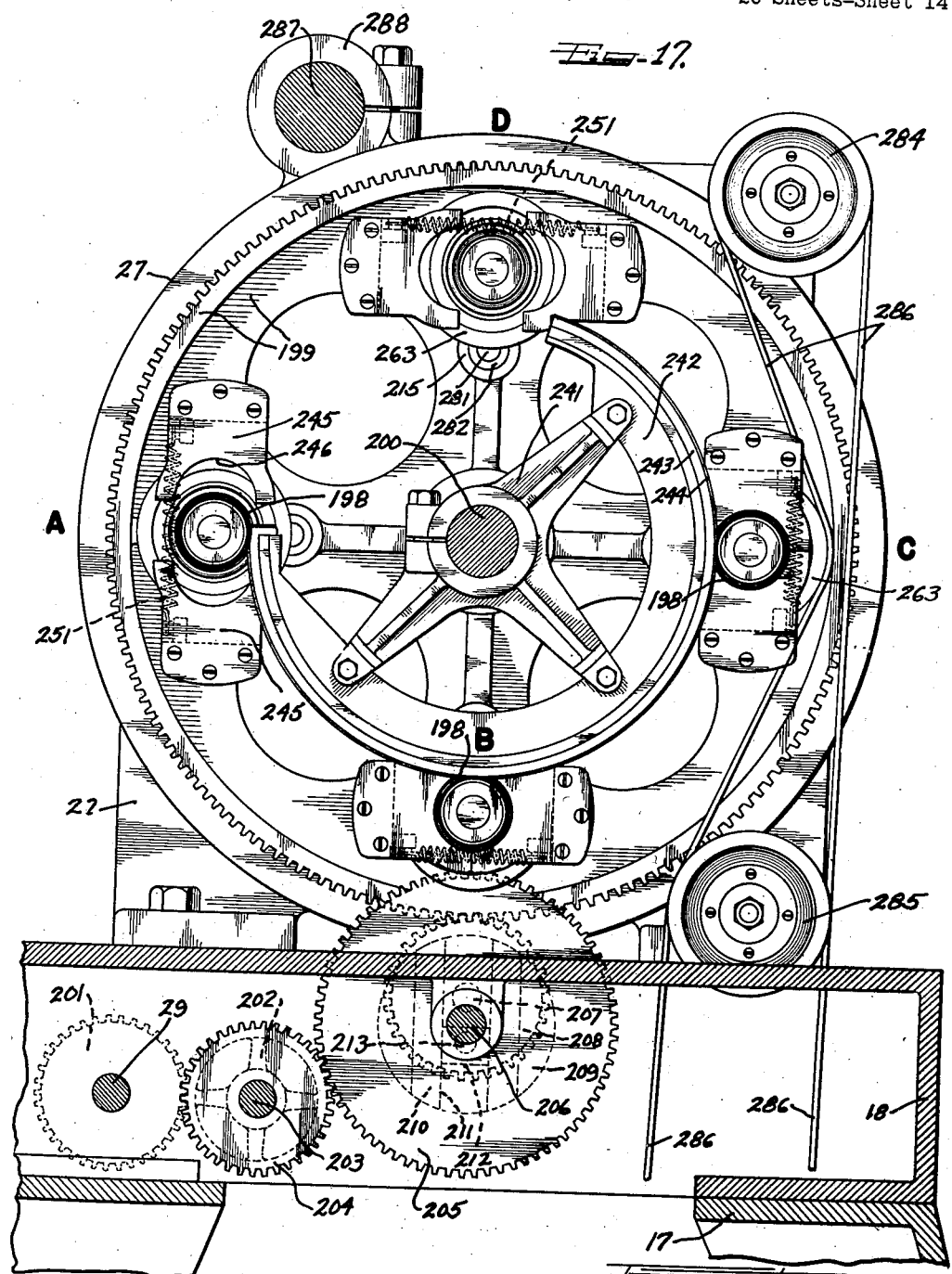

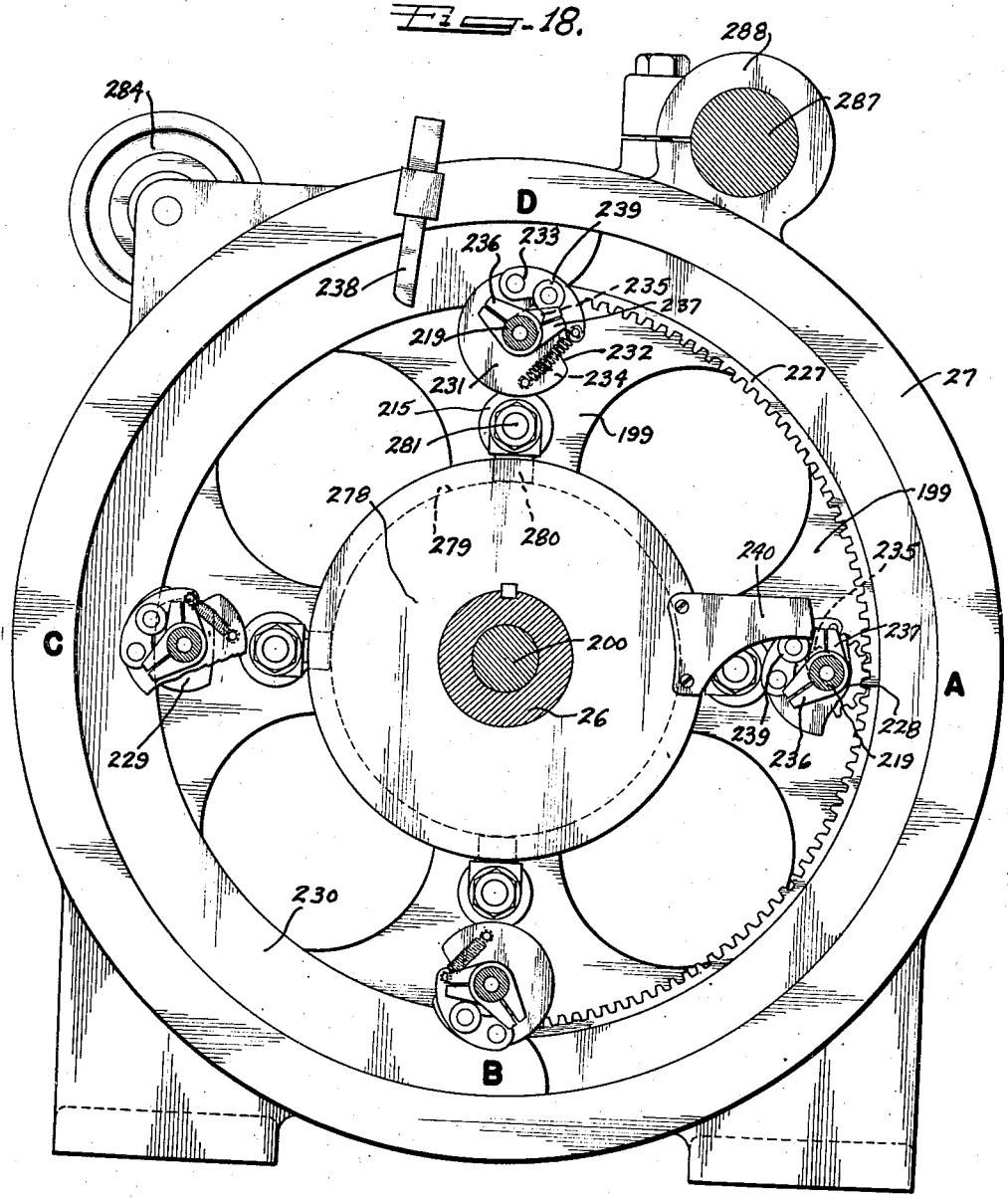

Dec. 23, 1941. C. BARBIERI 2,266,948
MACHINE FOR AND METHOD OF MAKING CONTAINERS
Filed June 6, 1940 20 Sheets-Sheet 16
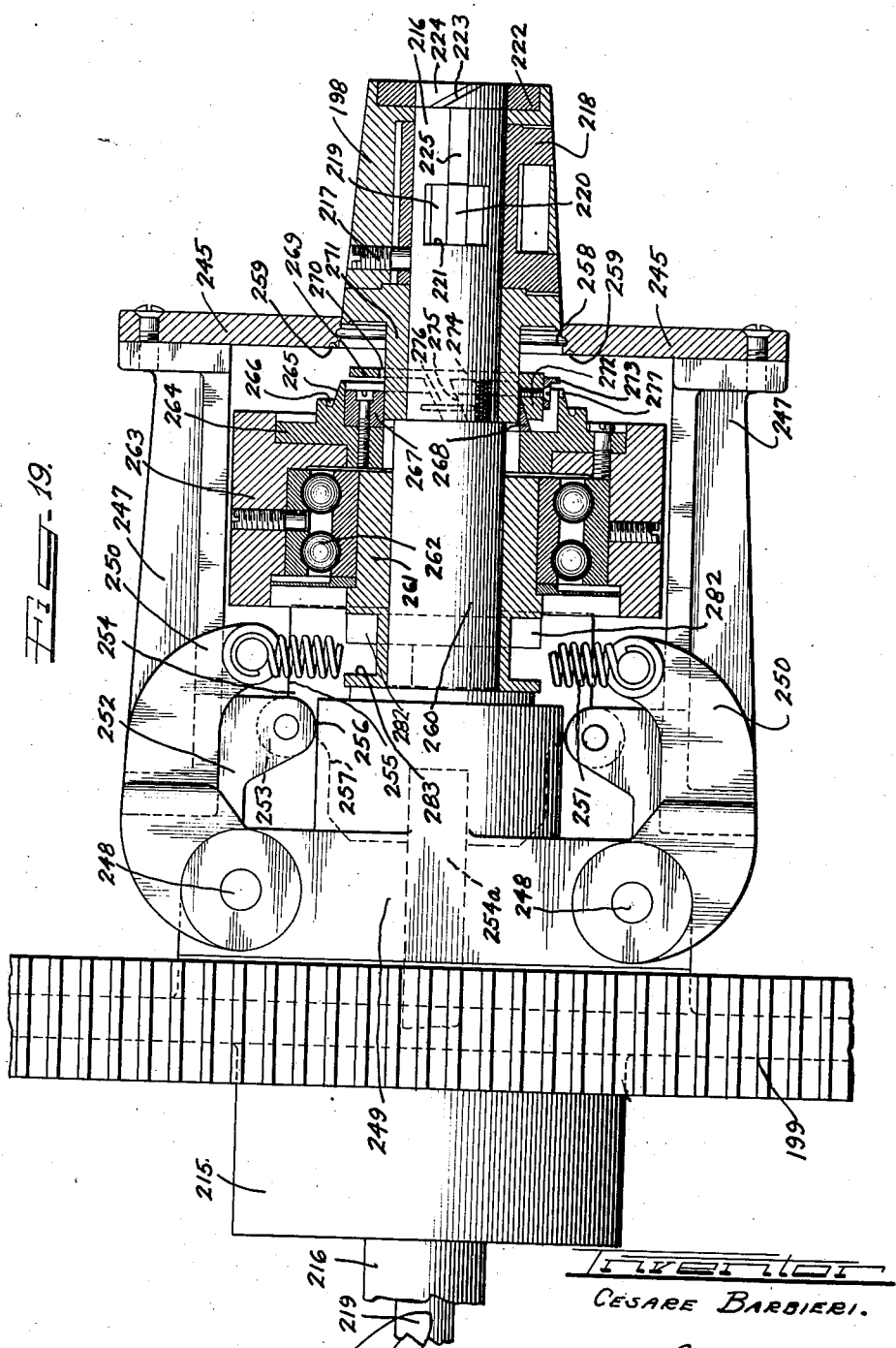
Inventor
CESARE BARBIERI.
by Charles O'Neill
Attys.

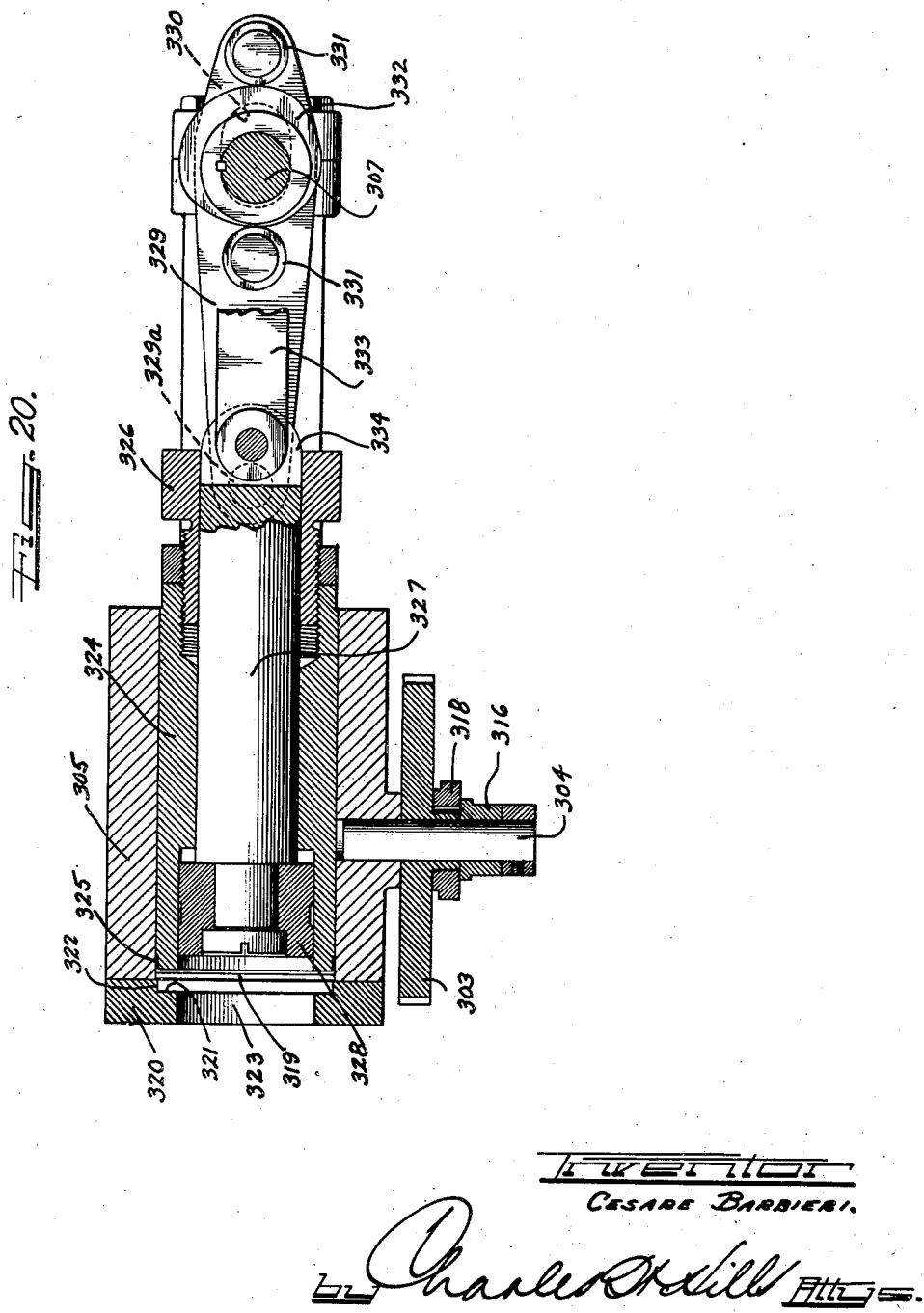

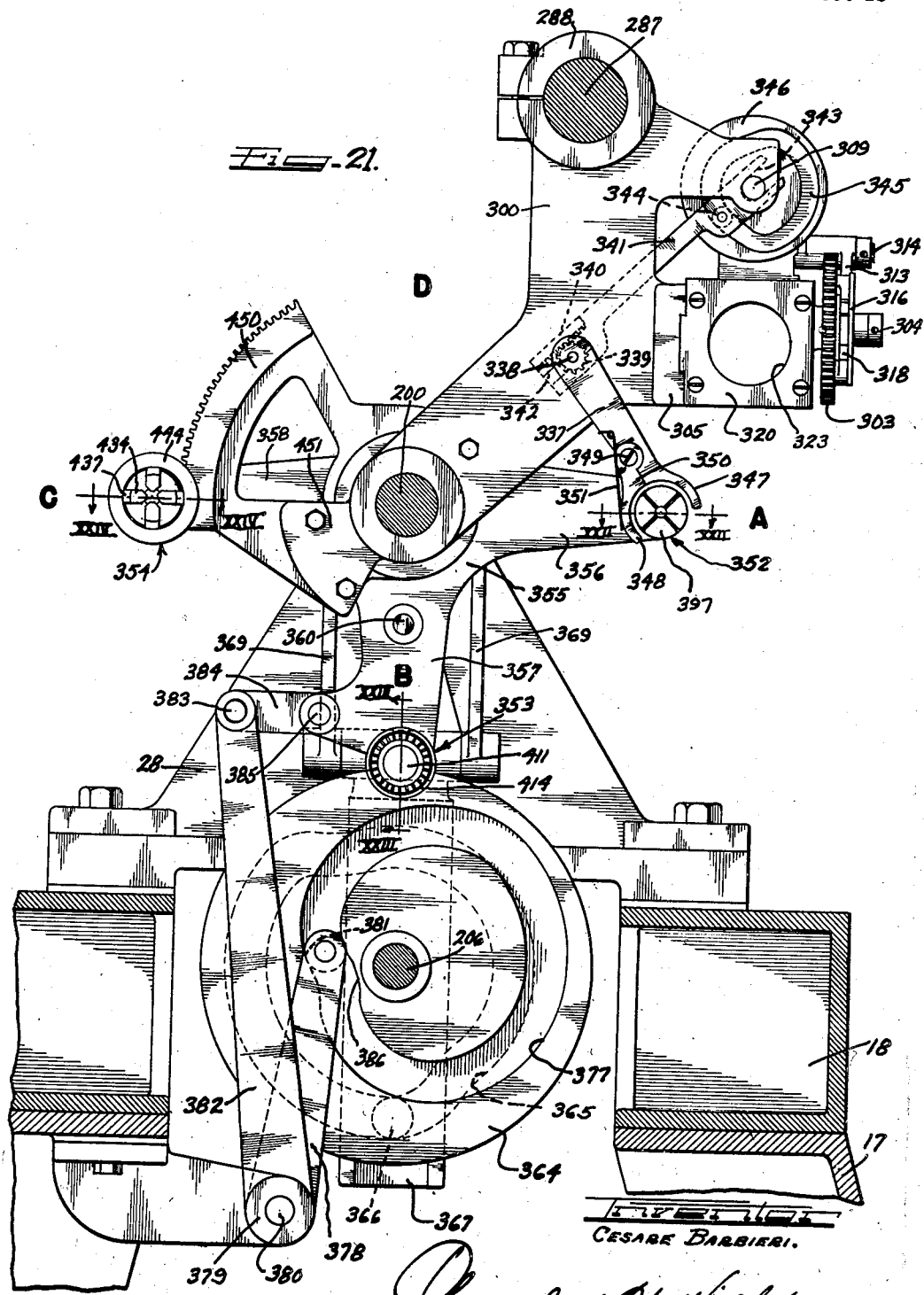

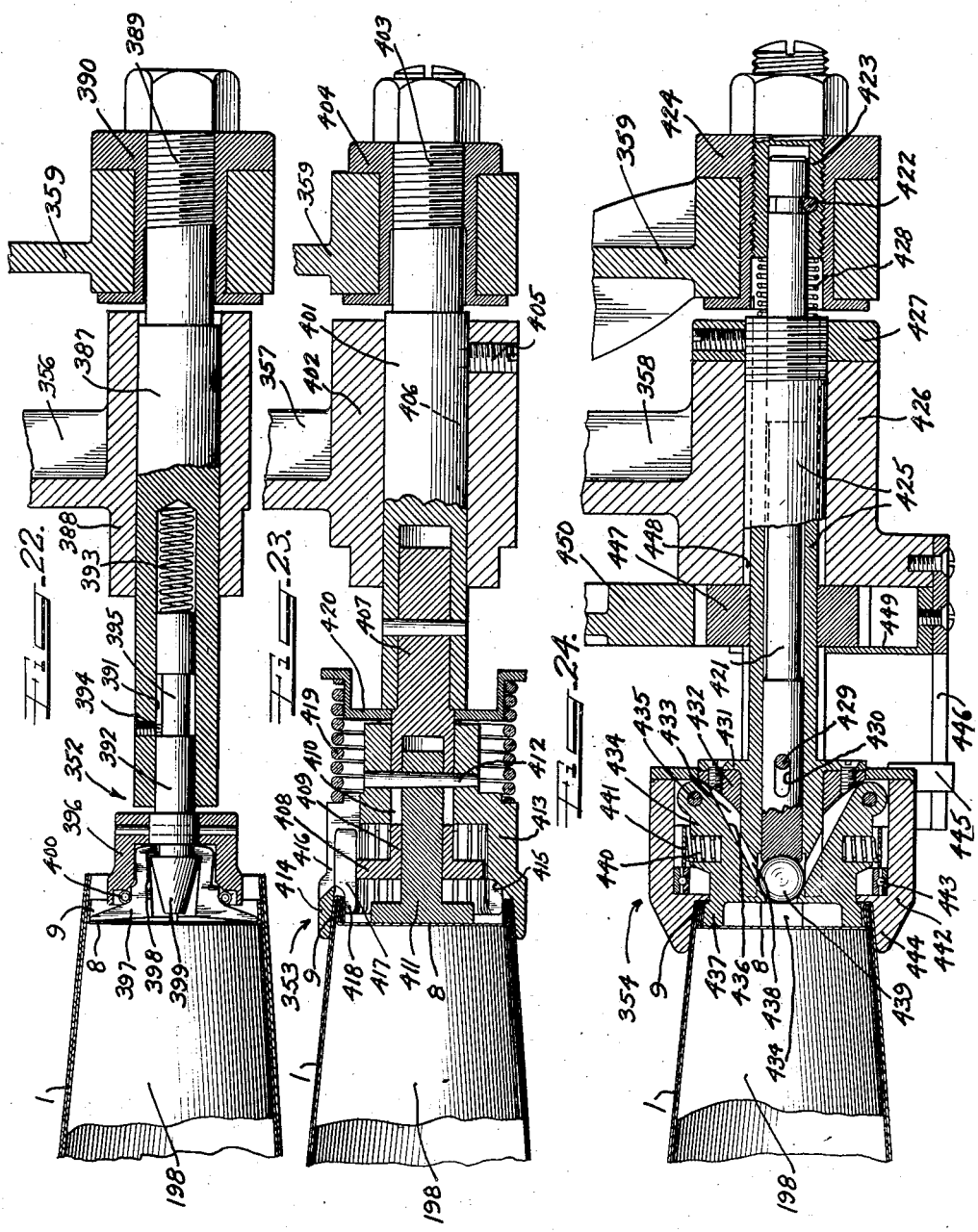

Dec. 23, 1941.  C. BARBIERI  2,266,948
MACHINE FOR AND METHOD OF MAKING CONTAINERS
Filed June 6, 1940  20 Sheets-Sheet 20
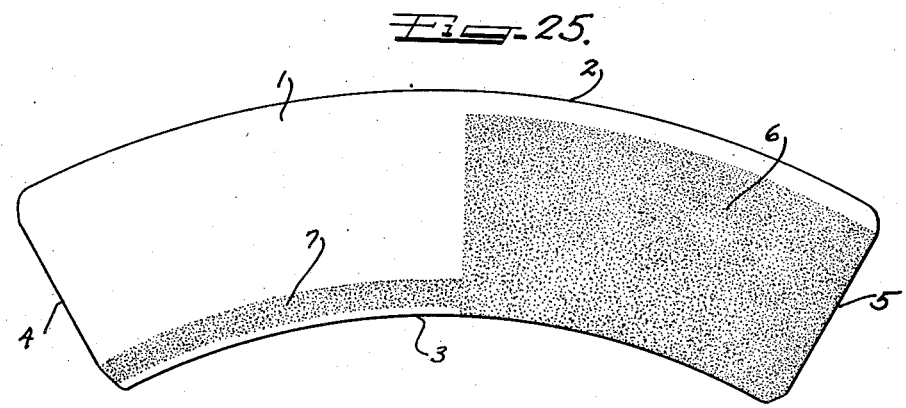
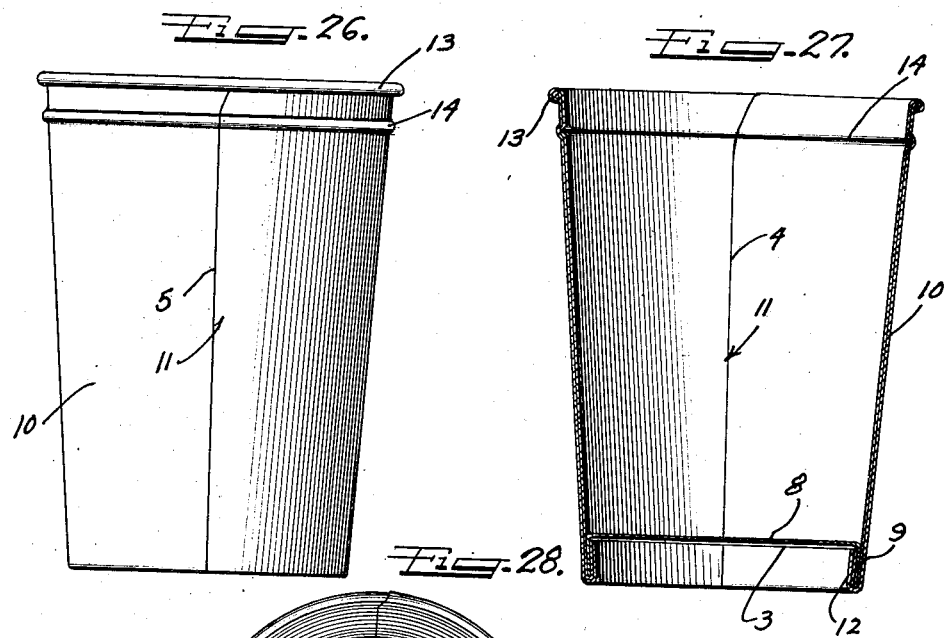
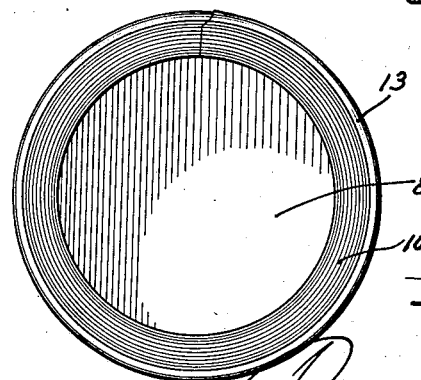

Patented Dec. 23, 1941

2,266,948

UNITED STATES PATENT OFFICE 2,266,948

MACHINE FOR AND METHOD OF MAKING CONTAINERS

Cesare Barbieri, New York, N. Y., assignor to Dixie-Vortex Company, Chicago, Ill., a corporation of Delaware Application June 6, 1940, Serial No. 339,054

25 Claims. (Cl. 93—39.3)

This invention relates to improvements in a machine for and a method of making containers, and more particularly containers of the type of paper drinking cups which are commonly discarded after a single usage, the present invention being highly desirable for use in connection with the manufacture of paper drinking cups especially designed to contain hot substances for a reasonable length of time or cold substances with a reasonable degree of heat insulation, although the invention will have other uses and purposes as will be apparent to one skilled in the art.

More specifically, the present invention relates to the manufacture of flat-bottom paper drinking cups arranged to accommodate a suitable cover, if desired, and provided with a double-thickness wall in the body portion, so that the cup will hold a hot liquid for a length of time without weakening of the cup to an undesirable extent and tend by the insulation of the double wall to reasonably maintain the temperature of the contents. Likewise, the cup may be used for cold contents, such as ice cream, cottage cheese, and similar substances. The cup is especially desirable for delivery, curb-service or takeout-service from drug stores and fountain luncheonette places in connection with the serving of coffee, malted milk, ice cream and similar commodities. Consequently, the cup must be sufficiently economical to warrant disposition after a single usage and further to warrant its usage without addition to the price of the particular commodity purchased.

I am aware that heretofore double-walled receptacles of this general character have been provided and means and methods have been developed for the making of such receptacles. However, in connection with machines designed to manufacture double-walled receptacles, especially from one single body blank which naturally would be substantially twice the length of a body blank for a similar container having only a single wall, difficulty has been experienced in the handling of the blank and in economically forming the blank into a container. A blank of this character usually is of substantially arcuate shape having a curved upper edge which ultimately defines the mouth of the container and a curved lower edge ultimately defining the lower end of the body portion of the container. A separate bottom blank is associated with the lower margin of the body blank to complete the cup. Most frequently, the finished cup is in the nature of a truncated cone, the side wall tapering from a larger diameter at the mouth of the cup to a smaller diameter at the base of the cup. Consequently, the curved edges of the blank are of different radii, and with the feeding of the blank as incorporated in machines heretofore known, difficulty was experienced in making a double-wound cup with the resultant blank edges in register with each other, and the loss through improperly formed cups was excessive. Further, formerly known cups of this character were not as simply and economically formed as is desirable.

With the foregoing in mind, it is an important object of the present invention to provide a machine for economically, simply, and accurately forming a double-walled paper container with great rapidity.

Another object of the invention is the provision of a machine for making a double-walled paper container in which a single blank is wound twice around to form the body portion of the container, and which blank is fed to forming position rapidly and accurately so that when wound, the respective edges of the blank will be in proper register with each other.

A further object of the invention resides in the provision of a machine for making double-walled paper containers, in which a single blank of material is fed to a forming mandrel along an arcuate path, the radius of which path is in keeping with the center of the converging sides of the forming mandrel and also in keeping with the curvature on the arcuate edges of the blank, whereby the blank will reach the mandrel in accurate position for forming, and it makes no difference if the blank is fed towards the mandrel with a variance in the degree of feed; that is, sometimes a little farther than other times. Such variance in feed can only result in a slight difference in the width of the overlapped marginal portions of the blank extending down the side of the finished container, but cannot cause the adjacent edges of the doubly wound blank to become out of register with each other.

Another feature of the invention resides in the provision of a machine for making double-walled paper containers, wherein a forming mandrel of the machine rotates sufficiently to wind the blank twice around itself, such rotation occurring at substantially the same time as was the case with previous machines for making single-walled paper containers.

It is also an object of this invention to provide a machine for making double-walled paper containers out of a single body blank and a bottom blank, wherein a plurality of mandrels are arranged to follow a translatory path, and each mandrel rotates sufficiently during a portion of that translatory path to wind the body blank twice around itself, engage and secure the bottom blank to the body blank, and contemporaneously finish the mouth end of the container.

A further feature of the invention resides in the provision of a machine for making a paper container and contemporaneously providing a curled rim bead at the mouth edge of the container and an annular groove inside the rim bead to accommodate a closure cap.

Also an object of the invention is the provision of a machine for making a paper container incorporating a body blank and a bottom blank, with means for joining the bottom blank to the lower portion of the body blank and contemporaneously with the uniting of the bottom and body blanks forming a turned rim bead at the mouth end of the container with an annular groove inside the rim bead for the accommodation of a closure cap.

Still another object of the invention resides in the provision of a machine for making a double-walled paper container, in which a single piece body blank of the container is fed substantially arcuately to a tapering forming mandrel, a bottom blank is provided at the end of the forming mandrel, and the forming mandrel is then rotated to wind the body blank twice around itself, the lower marginal portion of the body blank is turned inwardly over a flange of the bottom member and ironed in place, while contemporaneously a turned rim bead as well as an inner annular groove are provided on the opposite or mouth end of the container, all of which occurs while the adhesive joining the inside lap of the body portion to the outside lap and also joining the body blank to the bottom blank is not entirely set, and the paper is therefore in a more pliable and easily handled condition.

Still another feature of the invention is the provision of a new and novel method of making a double-walled paper container.

While some of the more salient features, characteristics and advantages of the present invention have been above pointed out, others will become apparent from the following disclosures, taken in conjunction with the accompanying drawings, in which:

Figure 1 is a plan view of a container making machine embodying principles of the present invention and capable of performing the method embodied in this invention;

Figure 2 is an enlarged fragmentary side-elevational view of the left-hand portion of the machine shown in Figure 1;

Figure 3 is a fragmentary plan view of that portion of the machine seen in Figure 2;

Figure 4 is a fragmentary plan view of the left-hand portion of the machine shown in Figure 1, with the super-structure and other parts removed and portions of the bed plate broken away for clarity in showing what lies beneath;

Figure 5 is a fragmentary vertical-sectional view taken substantially as indicated by the staggered section line V—V of Figure 3;

Figure 6 is an enlarged fragmentary vertical-sectional view through the super-structure and bed plate of the initial blank-feeding mechanism, taken substantially as indicated by the line VI—VI of Figure 3;

Figure 7 is an enlarged fragmentary vertical-sectional view of the gluing means and associated mechanism taken substantially as indicated by the line VII—VII of Figure 3, illustrating the position of the parts when a blank is not fed to the gluing mechanism;

Figure 8 is the same view as Figure 7, but illustrating the operation of the parts when a blank is fed to the gluing mechanism;

Figure 9 is a fragmentary vertical-sectional view, enlarged, illustrating part of the actuating mechanism for the intermediate blank feed, taken substantially as indicated by the line IX—IX of Figure 3;

Figure 10 is an enlarged fragmentary vertical sectional view detailing the actuating mechanism for the blank-holding fingers, taken substantially as indicated by the line X—X of Figure 3;

Figure 11 is an enlarged fragmentary plan view of the final blank-feeding mechanism seen in the central portion of Figure 1;

Figure 13 is an enlarged fragmentary elevational view of the final blank-feeding mechanism;

Figure 14 is an enlarged fragmentary vertical sectional view illustrating the control of the gripper jaws of the final blank-feeding mechanism, taken substantially as indicated by the line XIV—XIV of Figure 11;

Figure 15 is a fragmentary elevational view of the right-hand portion of the showing of Figure 1, illustrating the forming means and associated mechanism;

Figure 16 is an enlarged fragmentary vertical-sectional view, taken through the forming mechanism substantially as indicated by the line XVI—XVI of Figure 1;

Figure 17 is an enlarged transverse vertical-sectional view taken substantially as indicated by the line XVII—XVII of Figure 16;

Figure 18 is an enlarged transverse vertical-sectional view looking in the opposite direction, taken substantially as indicated by the line XVIII—XVIII of Figure 16;

Figure 19 is an enlarged fragmentary vertical-sectional view through one of the forming mandrels and its associated mechanism, taken substantially as indicated by the line XIX—XIX of Figure 16;

Figure 20 is an enlarged fragmentary plan-sectional view, with parts in elevation, illustrating the bottom blank cutting mechanism, taken substantially as indicated by the line XX—XX of Figure 15;

Figure 21 is an enlarged vertical-sectional view illustrating the cup bottom finishing mechanism and actuating means therefor, taken substantially as indicated by the line XXI—XXI of Figure 16;

Figure 22 is an enlarged fragmentary sectional view, with parts in elevation, illustrating the bottom blank positioning means, taken substantially as indicated by the line XXII—XXII of Figure 21;

Figure 23 is an enlarged fragmentary sectional view, with parts in elevation, illustrating the crimping mechanism for joining the body and bottom blanks, taken substantially as indicated by the line XXIII—XXIII of Figure 21;

Figure 24 is an enlarged fragmentary sectional view, with parts in elevation, of the bottom finishing means, taken substantially as indicated by the line XXIV—XXIV of Figure 21;

Figure 25 is a plan view of a cup body blank, showing the location of the adhesive applied thereto prior to the forming of the body blank;

Figure 26 is a side elevational view of a finished container;

Figure 27 is a central vertical-sectional view of the finished container; and

Figure 28 is a plan view of the finished container.

As shown on the drawings:

Figure 12:
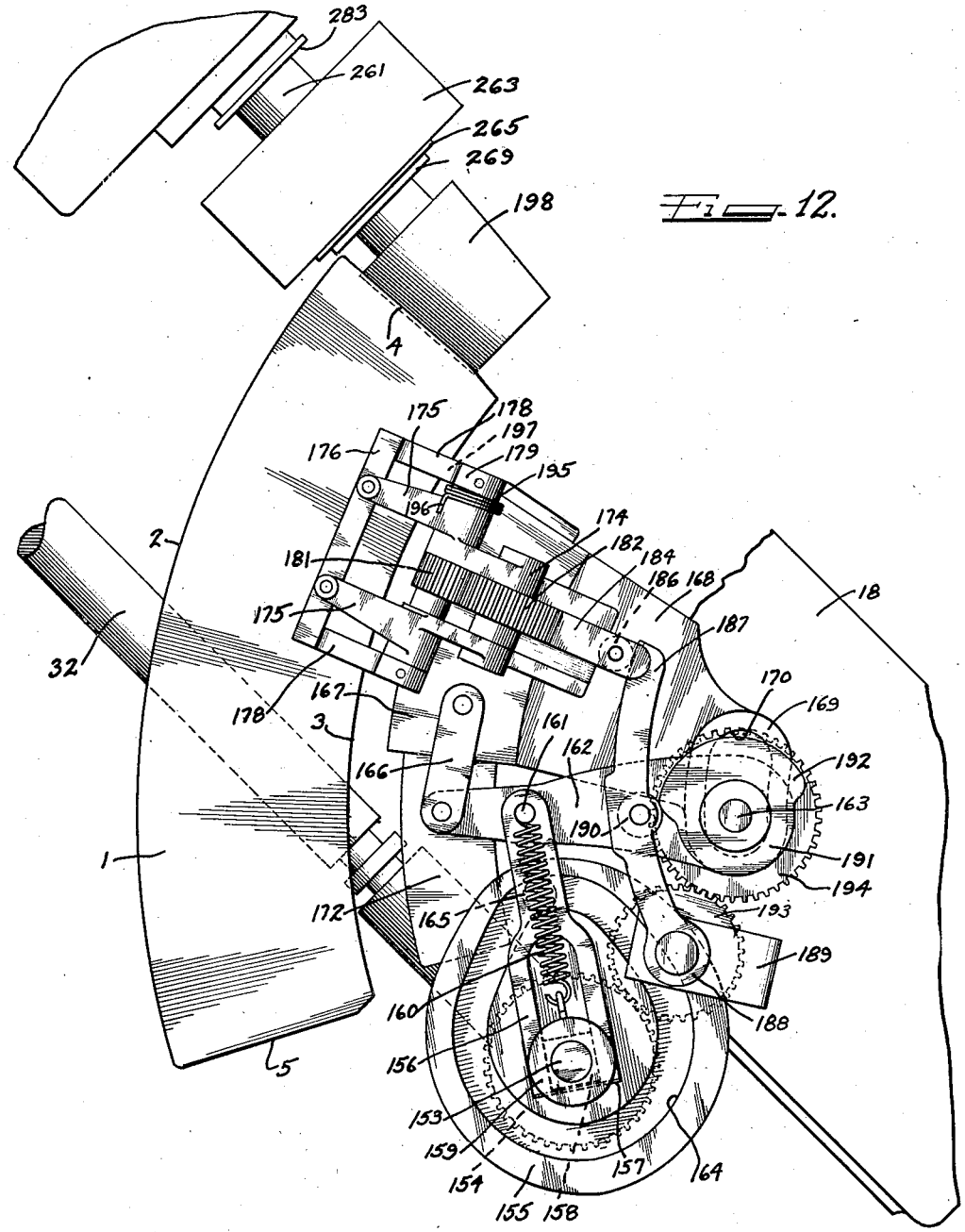
Figure 12 is a view like Figure 11, but showing the parts in a different stage of operation.

As a matter of presentation, the machine selected for purposes of illustration is capable of making a flat bottom container in the nature of a double-walled paper drinking cup, having a rolled rim bead at the mouth end and an annular groove inside the rim bead for the accommodation of a closure cap, if such is desired to be used. Without a closure cap, the inner groove appears as an outstanding bead on the outside of the cup and enhances the general appearance of the cup as a whole.

It will, of course, be appreciated that the resultant containers made upon the machine are not limited as to size, but may be made in various capacities. It will be apparent from the disclosures hereinafter that by varying the size of certain parts of the machine, making these parts larger or smaller as the case may be, cups or containers of different sizes may be manufactured without change in the function of the respective parts or in the operating principles of the machine.

The method in general

The machine illustrated and described herein is capable of making cups or containers by my new and novel method. For the purpose of clarity, therefore, that method will now be described in general, and the specific steps and features of the method will become apparent from the later description of the construction and operation of the machine itself.

The blanks are initially fed one at a time in successive order from a stack of pre-cut blanks along a predetermined path. Each blank is intermittently advanced along the path until it reaches a gluing station where glue is applied to the blank over substantially half its upper area, with the exception of a small margin adjacent that edge of the blank ultimately defining the mouth end of the cup, the remainder of the blank being devoid of glue with the exception of a margin near the opposite arcuate edge of the blank which ultimately defines the bottom of the body portion of the cup, this marginal stripe of glue aiding in joining the body part of the cup to the bottom blank. The feeding of the blank itself controls the actual application of adhesive to the blank; in other words, if for some reason no blank reaches the gluing station at a time in keeping with the operation of the gluing mechanism, the glue is not applied to anything.

After the application of adhesive, each blank is taken in its successive order and fed in a substantially arcuate direction to a forming mandrel in the nature of a truncated cone. The center of the arcuate path through which the blank travels to the forming mandrel is in keeping with a point defined by converging, diametrally opposed elements of the forming mandrel, which point is also in keeping with one or both of the arcuate edges of the blank itself.

Contemporaneously with or just before the body blank reaches the forming mandrel, a bottom blank is applied to the end of the mandrel, and the body blank is wound twice around the mandrel to form a double-walled body portion for the cup, the lower portion of the body part extending beyond a flange on the bottom blank. As the blank then is kept continuously traveling along a predetermined path, the lower margin of the body part is turned inwardly around the flange on the bottom blank, crimped in place, and then pressed and ironed to give a smooth finish to and rigidify the bottom of the container. Contemporaneously with the joining of the body portion to the bottom blank, an outwardly curled rim bead is provided at the mouth end of the container, and spaced somewhat inwardly of this rim bead an internal annular groove is provided to ultimately accommodate a closure cap.

The bottom finishing operation and the provision of the rim bead and internal groove are preferably effected before the adhesive in the body portion of the blank has had opportunity to fully set so that the paper going to make up the cup is in a more pliable condition and the formation thus accomplished with greater facility. After the container has been thus completed, it is automatically ejected from the forming mandrel into a receiving chute in which it is automatically assembled in stacked nested relationship with previously formed containers.

The blank and cup

With reference to Figure 25 of the drawings, there is seen an elongated, substantially quadrangular blank 1 having a longer arcuate edge 2 at the top of the blank for ultimately defining the mouth of the finished container, and a shorter arcuate edge 3 of a different radius at the lower end of the blank, which edge and the margin thereagainst is ultimately associated with the circular bottom blank. Connecting these arcuate edges 2 and 3 are a pair of opposed substantially straight converging side edges 4 and 5 respectively. The blank is of such length as to be wound twice around to form the body portion of the container.

Prior to the shaping of the blank, it is provided on one side with adhesive, all of the adhesive being preferably provided in a single operation and including an enlarged patch or area 6 which covers entirely substantially one-half of the blank, with the exception of a narrow marginal portion adjacent the edge 2. The other half of the blank is provided only with a stripe 7 of adhesive adjacent the other arcuate edge 3 of the blank, this stripe 7 being set back slightly from the edge 3 to prevent squeezing out of the adhesive beyond the edge of the blank when the bottom fold-over is ironed in position.

The blank is wound both around a forming mandrel to be later described and a bottom member 8 having an outstanding flange 9. Winding the body blank twice around gives a container with a double-thickness wall, as indicated at 10 in Figures 27, there being a triple thickness, of course, for the width of a side seam, generally indicated at 11.

The lower marginal portion of the double-walled body is turned inwardly around the flange 9 of the bottom member 8 as indicated at 12 and ironed in position, with the adhesive stripe 7 joining the body portion to the flange of the bottom member. At the mouth end of the cup, a downwardly and outwardly turned rim bead 13 is provided. Inside the rim bead 13, an annular groove 14 is provided for the reception of a closure cap or the like, not illustrated in the drawings. Such a groove will provide a ready and positive seat for a closure cap in view of the inward taper of the cup wall.

The machine in general

With reference more particularly to Figures 1, 2, 5 and 15, it will be seen that the machine in general includes a frame construction embodying a base portion 15 carrying a pair of opposed side wall portions 16—16 and a base portion 17 carrying a hollow bed portion 18, disposed at an angle to the base portion 15 and side portions 16—16, as best seen in Figure 1, these parts being joined together by a frame portion 19 to provide a substantially integral frame structure for the entire machine. The side rails 16—16 are cross-connected where needed, as indicated at 20, and between and over these rails a bed plate 21 is provided. Above the bed plate 21, the frame arrangement also includes a super-structure 22, which super-structure supports the blank magazine and a portion of the initial feed mechanism. Spaced from the super-structure 22 is a pair of bearing brackets 23—23 which, together with a pair of similar upstanding supports 24—24, carry the glue-backing roll and the trip mechanism to prevent the inadvertent application of glue when no blank passes beneath the backing roll. The frame portion 15 also carries a suitable support 25 for a glue pot and application mechanism disposed beneath an overhanging portion of the side rails 16—16, as seen in Figures 2 and 5.

On the bed portion 18 of the frame construction (Figures 1 and 15) a spider support 26, together with a turret wheel housing 27, carries the mandrel-carrying turret wheel and associated mechanism to cause a proper functioning of the forming mandrels. On the opposite side of the bed 18, an upstanding super-structure 28 aids in carrying the bottom-forming mechanism and the actuating means therefor.

It will be appreciated that the frame arrangement above described will be fabricated and shaped to adequately support the various parts of the machine, and suitable journal and bearing means will be associated with the frame members to accommodate the various shafts, all in a manner to meet the exigencies of the particular construction. Accordingly, it will not be necessary herein to specifically describe every angle and formation of the frame arrangement and mention each bearing, journal, auxiliary supports and the like for the various shafts and other operative units, since such structures are illustrated and their respective functions known without specific explanation.

Before proceeding with a detailed description of the various operating parts of the machine, it may be best to first locate the main prime movers of the machine. The main drive shaft for the entire machine is indicated at 29 in Figure 15, which shaft may be connected by any suitable means to a source of power, such as an electric motor, not shown on the drawings. At one end thereof, the drive shaft 29 carries a hand wheel 30 for manual operation of the machine when desired, such as during adjustments, supplying a new ribbon of bottom-blank paper, etc. Through gearing 31, the drive shaft 29 operates a secondary drive shaft 32 which parallels the base portion 17 of the machine, being disposed at an angle to the base portion 15. At one end, this secondary drive shaft 32 actuates the final blank-feeding mechanism, and at the opposite end is provided with a bevel-gear arrangement 33 (Figure 1) through which it operates a shaft 34 extending transversely through the base portion 15, and which in turn actuates the initial and intermediate feeding mechanisms. All of the other various parts of the machine receive their drive directly or indirectly from the main drive shaft 29 and the last said shaft 34.

The initial blank-feeding mechanism

This mechanism is that which transports the blank from a blank magazine to the gluing mechanism and is best seen in Figures 2, 3, 4, 5 and 6. With reference more particularly to Figure 6, it will be seen that the super-structure 22 carries a blank magazine in the nature of a housing 35 having an opening 36 in the top thereof of the general shape of a blank 1. A series of upright posts 37 extend through the magazine housing 35 and are disposed so as to generally define the contour of a blank 1. A stack of blanks 1 may therefore be placed inside the post 37, and the stack will automatically find its way through the opening 36 to the lower part of the magazine.

As seen best in Figure 6, when the blanks rest upon the bottom of the magazine, the rear portions of the blanks are canted upwardly by a pair of relatively narrow friction elements 38 extending through the bottom of the magazine. The height of the friction elements 38 may be regulated as deemed best by the screw-threaded regulators 39. If for any reason it is desired to elevate the blanks in the magazine, such may be done by means of a handle 40 (Figures 2 and 3) attached to the rear portion of a pair of bell crank arms 41 carried on a shaft 42, the forward portion of each of these arms terminating in a foot 43 extending upwardly through a suitable aperture in the magazine bottom. A downward pull on the handle 40 will thereby cause a raising of the blanks in the magazine.

Near one side of the magazine 35, a pair of blank feeding or dispensing rolls are located, including a lower roll 44 and an upper roll 45. The lower roll, as will be seen in Figure 2, is driven from the aforesaid shaft 34 through a gear 46, a gear 47, a gear 48 carried on a shaft 49, a train of two or more gears 50 carried on stub shafts, and finally a gear 51 carried on the shaft of the roll 44. The upper roll 45 is driven from the lower roll 44 by like gears 46 disposed on these rolls at the other side of the machine (Figure 3). With reference to Figure 2, it will be noted that the upper roll 45 is carried in floating spring-pressed bearings 52, and this roll may be raised and lowered at will by means of a handle 53 acting through a free shaft 54.

The blanks are initially moved one at a time from the bottom of the stack to the rolls 44 and 45 by means of a pair of elongated friction-surfaced dispenser pads 55 carried on a shaft 56 driven through suitable gearing 57 (Figure 3) from the aforesaid shaft 49. It will be noted that the dispensing pads 55 are segmental in cross-section and have an arcuate outer face. Thus, these pads will strike the lowermost blank in the stack periodically and maintain advancing contact with that blank throughout the width of the outer face of the pads. With each rotation of the shaft 56, therefore, one blank is fed to the rolls 44 and 45. The aforesaid friction elements 38 aid in insuring the feeding of only one blank at a time, and to further insure single-blank feeding, one or more pointed bars 58 extend downwardly into the magazine, the lower ends of these bars being spaced just sufficiently from the bottom of the magazine to allow the passage of but a single blank.

As the rolls 44 and 45 feed a blank out of the magazine, the blank falls down upon the bed plate 21, as indicated by dotted lines in Figure 6. With reference to Figures 3 and 4, it will be noted that the bed plate 21 is provided with a pair of spaced elongated slots or openings 59—59. Beneath the level of the bed plate and in line with each of the openings 59—59, an endless conveyor 60 in the nature of a sprocket chain is disposed. These conveyors travel along longitudinally of the bed plate, and each is equipped with a series of spaced pusher elements 61 projecting upwardly through the respective opening 59. When a blank 1 falls upon the bed plate 21, a pusher element 61 from each of the conveyors 60 engages the rear edge of the blank and advances it forwardly along the bed plate, with the shorter arcuate edge of the blank foremost, as seen best in Figure 4. The conveyors 60 carry the pusher elements 61 in alignment, and the conveyors are, of course, synchronously driven.

At one end of its track, each conveyor engages over a driving sprocket 62 on a driven shaft 63 (Figure 5).

Referring to Figures 2 and 4, it will be seen that the chain conveyors 60 are intermittently driven from the aforesaid shaft 34. A pitman 64 is pivoted at one end to the drive gear 46 and at the other end to a rotatable disk 65 on a stub shaft 66. This disk 65 also carries a pawl 67 arranged for engagement with the teeth of a ratchet wheel 68 fixed to the hub portion of a gear 69 which floats on the shaft 66. It will therefore be apparent that the upstroke of the pitman 64 will rotate the disk and also the gear 69 by virtue of the pawl and ratchet engagement in a counter-clockwise direction as seen in Figure 2, while the reverse or downstroke of the pitman 64 will leave the gear 69 stationary. The gear 69 thereby intermittently drives a gear 70 (Figure 2) fixed to the aforesaid sprocket wheel shaft 63. Each upward stroke of the pitman 64 advances the conveyors 60 sufficiently to move a blank 1 along the bed plate 21 enough distance to make room for the next blank discharged from the magazine by the rolls 44 and 45. At the other end thereof, each conveyor belt 60 is engaged over a sprocket wheel 71 mounted on a free shaft 72 carried in a pair of opposed adjustable bearings 73, the location of which may be varied to increase or decrease the tension on the conveyors 60.

Briefly, in operation, the initial blank feeding mechanism acts to dispense the lowermost blank from the magazine 35 by means of the friction members 55 and the rollers 44 and 45, permitting the blank to fall upon the bed plate 21, along which it is intermittently advanced by the engagement with the rear edge of the blank of the pusher members 61 upon the conveyors 60—60. At the proper time, the blank is advanced by the conveyors 60—60 directly into engagement with the gluing mechanism now about to be described.

*The gluing means and associated mechanism*

With reference more particularly to Figures 2, 5, 7 and 8, it will be seen that the gluing means include a glue-applying roll 74 on a shaft 75, this applying roll carrying an application pad 76 on its outer surface of a proper shape to apply the area of glue 6—7 seen in Figure 25 to the underside of a passing blank. Above the roll 74 is a backing roll 77 on a shaft 78 journalled in a pair of spring-pressed floating bearings 79 carried in the aforesaid bearing brackets 24—24. Normally, the roll 77 is held downwardly in position to be contacted by the pad 76 on the glue roll 74, so that the backing roll 77 and the pad 76 act as a further feeding means for advancing the blanks.

As seen best in Figure 2, the shaft 75 carrying the glue roll 74 is driven from the aforesaid shaft 49 through a bevel-gear connection 80, an outboard shaft 81, and a bevel-gear connection 82. The backing roll 77 is driven from the glue roll through a gear 83 on the shaft 75 and a smaller gear 84 on the shaft 78 of the backing roll.

Referring now to Figures 2 and 5, it will be seen that a glue pot 85 having a suitable pivotal cover 86 is disposed on the aforesaid support 25 below the glue-applying roll 74. Inside the glue pot is a dispensing roll 87 on a shaft 88, and normally in contact with the outer face of the dispensing roll is a glue-delivery roll 89 carried on the free end of a frame 90 pivoted to the glue pot. As seen in Figure 2, the frame 90 has a rider 91 depending therefrom which rolls over the edge of a cam 92 also fixed to the shaft 88. This cam 92 is provided with a humped portion 93 which periodically raises the frame 90 and likewise the glue-delivery roll 89 so that the latter rolls over the face of the pad 76 on the glue-applying wheel 74 just prior to the contact of the pad 76 with a blank 1. The glue dispensing roll 87 is rotated in synchronism with the applying roll 74 by way of a sprocket and chain drive 94 between the shafts 75 and 88.

In the event no blank is fed between the applying roll 74 and the backing roll 77, it is desirable to avoid contact between the pad 76 and the backing roll so as to prevent smearing of the backing roll with glue and thus interfere with subsequent operation by the next following blank stitching to the backing roll rather than pursuing its intended course of travel therebeyond. With this in mind, an arrangement is provided where if a blank follows its natural course and moves into a position to enter between the rolls 74 and 77, the backing roll 77 remains in position, that is, its lowermost position; but, on the other hand, if no blank arrives for entry between the rolls 74 and 77, the roll 77 is automatically elevated, as indicated in dotted lines in Figure 7, so that the glue pad 76 will not contact the backing roll.

This arrangement for keeping the backing roll free from glue is best seen in Figures 5, 7 and 8. From these figures, it will be seen that the bed plate 21 is provided with an opening 95 just in front of the backing roll 77. Above this opening, a cross bar 96 extends transversely of the machine, and in a substantially central location carries a support 97 to which is pivoted a bell crank trigger 98, the lower portion of which extends through the opening 95 in the bed plate 21. This trigger is pivoted sufficiently freely that a blank 1 traveling along the bed plate 21 will by itself elevate the trigger out of the opening 95, as shown in Figure 8. If no blank passes, the trigger will remain extended through the opening, as seen in Figure 7. The other arm of the trigger 98 is provided with a head 99 for a purpose that will later appear.

The aforesaid bearing brackets 23—23 on the side rails 16—16 carry a transverse shaft 100 from which a pair of oppositely disposed links 101—101 depend. These links are freely pivotal about the shaft 100 and at their lower or free ends carry another transverse shaft 102. Substantially centrally disposed on the shaft 102 is a latch member 103 having a toothed formation 104 for engagement with the head 99 of the trigger 98 in the event a blank does not pass by the trigger. To one end of the suspended shaft 102 an end of a pitman 105 is connected, this pitman extending along the side of the machine, as seen in Figures 3 and 5, and the opposite end of which is bifurcated as indicated at 106 to straddle the aforesaid shaft 49. Also fixed to the shaft 49 adjacent its outer end is a cam member 107 having a cam groove 108 (Figure 5) therein, and the pitman 105 carries a rotary rider 109 disposed within the cam groove. With the continuous rotation of the shaft 49 and the shape of the cam groove 108, the pitman is caused to reciprocate in synchronism with the travel of blanks along the bed plate 21.

The forward movement of the pitman, that is, in the direction of travel of the blanks 1, will either elevate the backing roll 77 or let it remain in its normal spring-pressed location, depending upon whether or not a blank actuates the trigger 98. This is accomplished by means including a pair of opposed links 110, each of which has one end pivoted to the end of a shaft 103a carried by the upper portion of the latch member 103 above the shaft 102, and the other end pivoted as at 111 to an upright arm 112 of a bell crank lever, pivoted at an intermediate point 113 to the support 24 (Figures 7 and 8). The other arm 114 of the bell crank lever extends beneath the spring-pressed bearing 79 of the backing roll shaft 78 and is provided with a knob-like head 115 for contact with the underside of the bearing. Normally, as seen by the full lines in Figure 8, the head 115 is spaced slightly below the bearings 79, out of contact therewith.

Now, if a blank 1 trips the trigger 98, as indicated in full lines in Figure 8, the backing roll 77 will remain in position to provide back pressure for the glue pad 76 which impresses glue on the underside of the blank. With the head 99 of the trigger out of the way of the latch member 103, the forward movement of the pitman 105 will merely swing the latch member and the suspended shaft 102 forwardly above the trigger, causing a slight movement of the links 110 and the bell-crank levers 112—112 sufficiently for the heads 115 of these levers to contact the bearings 79. The weight of the backing roll 77 and the bearings 79, aided by the spring pressure upon these bearings, will prevent any elevation of the backing roll, all as indicated by the dotted lines in Figure 8.

On the other hand, if no blank passes beneath the trigger 98, it will remain in the position seen in Figure 7. In that event, the forward movement of the pitman 105 will cause engagement of the latch member 103 with the head 99 of the trigger, causing the lower arm of the trigger to be held in position by contact with the bed plate 21. Thus, further forward movement of the suspended shaft 102 is prevented and the latch member is caused to pivot on the shaft 102, urging the links 110 forwardly as indicated by dotted lines in Figure 7, thus causing the head 115 of the bell crank lever to force the backing roll 77, its shaft 78, and the bearings 79 upwardly against the action of the spring pressure so that there will be no chance of the glue pad 76 contacting the naked backing roll.

Briefly, the operation of the gluing means and associated mechanism may be described as follows:

Just prior to the passage of a blank 1 between the glue-applying roll 74 and the backing roll 77, the frame 90 carrying the delivery roll 89 is elevated by the cam 93 so that the delivery roll will contact and deliver to the glue pad 76 an adequate supply of adhesive. The pad 76 will then contact the underside of the blank 1 and apply thereto the area of glue shown at 6—7 in Figure 25, at the same time feeding the blank forwardly with the aid of the backing roll 77. During this time, the pitman 105 will merely swing the latch member 103 forwardly above the trigger 98 which has been moved out of contact with the latch member by the blank itself, thus preventing an elevation of the backing roll 77. If, however, no blank passes between the gluing roll and backing roll, the glue pad 76 nevertheless will receive its supply of glue from the continuously operating mechanism, but the pitman 105 will have caused contact of the latch member 103 with the head 99 of the trigger, forcing the latch member to pivot and actuate the bell crank levers 112—112 to elevate the backing roll 77 out of contact with the glue pad 76.

*The intermediate blank feeding arrangement*

This arrangement is best seen in Figures 3, 5, 9 and 10, and includes means for advancing the blank to a position to be picked up by the final feeding means to be later described, and means for holding the blank in that position until it is picked up by the final feeding means, the holding means being retractable contemporaneously with the engagement of the blank by the final feeding means.

As seen in Figure 3, the glue roll 74 and the backing roll 77 feed the blank forwardly onto a number of spaced supporting fingers 116 each of which is carried by a flanged hub 117 on a fixed shaft 118. These fingers 116 are preferably flat metallic strips turned edgewise, and it will be noted that the outermost fingers are somewhat longer than the inside fingers, so that a line drawn through the extremities of all the fingers 116 would be substantially in keeping with the curvature of the leading edge of a blank 1. After being discharged by the rolls 74 and 77 after the application of glue to the underside of the blank, the blank comes to rest upon the fingers 116, the narrowness of the fingers preventing undue adherence of the blank to the fingers or undue transference of glue from the blank to the fingers. When in this position, the blank is ready to be further advanced by intermediate feeding means now about to be described.

With reference to Figure 4, the leading blank 1 will be seen resting upon the fingers 116 in position to be engaged adjacent each end thereof at its rear edge by a pusher element 119 carried on the end of a reciprocable bar 120. The rear portion of each bar 120 rides in the groove of a pulley 121 mounted on a free shaft 122. The forward portion of each bar 120 rests in the groove of a yoke member 123 pivoted to a stud shaft 124 (Figure 4) adjacent an end thereof. The bar 120 rests upon a roller 124 within the groove in the yoke member, as seen best in Figure 9. This yoke member also carries a rotary cam rider 125 extending outwardly in position to ride the surface of a cam 126 carried by the aforesaid shaft 75 which also carries the glue applying roll 74. The cam 126 is provided with a hump 127 which will periodically raise the forward portion of the bar 120 from the dotted line position seen in Figure 9 to the full line position in the same figure, and will maintain the bar in this elevated position a sufficient time for the bar, together with its pusher 119, to move forwardly from its full line position to its dotted line position, as seen in Figure 9. The bar may then drop to its dotted line position and return to its original position for the beginning of another reciprocatory cycle, after dropping.

The actuating mechanism for reciprocating the bars 120—120 is best seen in Figures 4 and 5, with particular reference to Figure 5. A stub shaft 128 is journalled in the frame portion 15 and is continuously driven by virtue of a gear 129 carried on its outer end in mesh with the aforesaid gear 46 on the drive shaft 34 (Figure 2). On its inner end, the shaft 128 carries a cam member 130 having a cam groove 131 in the side surface thereof. A forked member 132 carries a rotary cam rider 133 extending from one side thereof into the groove 131. The forked portion of the member 132 slides back and forth over a block 134 on the shaft 128 as the cam rider 133 follows the groove in the cam. The other end of the member 132 is pivoted to the outer end of a crank-arm 135 keyed to a shaft 136 extending transversely of the machine.

On each side of the machine, an actuator for the respective reciprocatory rod 120 is provided in the nature of an oscillating arm 137, one end of which is keyed to the shaft 136. The other end of the arm 137 is pivoted to a link 138 which is in turn pivotally connected to the respective rod 120. From this description, it will be appreciated that the continuous rotation of the cam 130 causes the forked member 132 to rock the shaft 136 and cause back-and-forth oscillation of the arms 137—137 to move the rods 120—120 back and forth.

The forward movement of the rods 120—120 transfers a glued blank 1 from its full-line position in Figure 4 resting upon the fingers 116 to its dotted-line position, where it rests upon a set of pivotally mounted fingers 139, which are also preferably relatively thin elements turned edgewise to prevent sticking and undue loss of glue from the blank. The fingers 139 also vary in length so that a line drawn through the tips of the fingers would substantially follow the arcuate leading edge of the blank. Each of these fingers 139 is carried on an arm 140 (Figure 10), the other end of which arm is keyed to a rock shaft 141 on one end of which is a pinion 142. In mesh with the pinion 142 therebeneath is a rack bar 143, the rear end of which is bifurcated as indicated at 144, the furcations being closed by a laterally outstanding bar 145. Forward of the furcations 144, the rack carries a rotary cam rider 146 which rides the surface of a cam 147 keyed to the aforesaid shaft 75 and disposed between the rider 146 and the bar 145. This cam has a hump 148 thereon by reason of which the rack 143 is caused to reciprocate. The forward movement of the rack 143 elevates the fingers 139 to the full-line position seen in Figure 10, while a backward movement of the rack drops the fingers to the dotted-line position in Figure 10.

With reference to Figure 2, it will be seen that the rack is stabilized and held in positive position by a supporting roller 149 upon which it rides. With reference to Figure 4, it will be seen that the final feeding means, shown to the right in this figure and not as yet described, grasps the blank while it rests upon the fingers 139. The downward pivoting of these fingers by the rack bar 143 occurs contemporaneously with or shortly after the blank is engaged by the final feeding means, in order to remove the fingers from the path of the final feeding means during its delivery of the blank to the forming mechanism.

Briefly, the operation of the intermediate blank feeding arrangement includes advancing of the blank from its position on the fingers 116 to a position on the pivotally mounted fingers 139 by means of the forward portion of the reciprocatory movement of the rods 120—120. While the blank is at rest upon the fingers 116, the forward portions of the rods 120—120 are elevated by the cams 126—126, and then these rods are moved forwardly by the rocking arms 137—137. The arms then drop to their previous position and return to a position behind the fingers 116 ready for engagement with the next following blank. Almost as soon as the blank is delivered to the fingers 139, it is engaged by the final feeding mechanism, and contemporaneously with or shortly after such engagement, the rack 143 actuates the shaft 141 to lower the fingers 139 out of the way of the further movement of the final feeding mechanism.

The final blank feeding mechanism

The mechanism which transfers the blank from the fingers 139 to forming position is best seen in Figures 1, 11, 12, 13 and 14. This mechanism transfers the blank along an arcuate path which is in keeping with the arcuate shape of the blank itself.

With reference to Figure 13, it will be seen that the final feeding mechanism is carried by a suitable frame 150 on the bed portion 18 of the main frame, and a housing 151 providing journal means for the various shafts is attached to the top of the frame 150. The mechanism itself is driven through a bevel gear connection 152 by the aforesaid intermediate drive shaft 32, and includes a main drive shaft 153 rising vertically from the bevel drive connection 152, on the top of which shaft is carried a drive gear 154 and a control cam 155. Above the control cam is a forked connecting rod 156 closed at its forked end by a bar 157, and slidable between the forks over a block 158 on the shaft 153. Above the connecting rod 156 is a collar member 159, to which one end of a tension spring 160 is anchored, the outer end of this spring being anchored to a pivotal connection 161 between the end of the connecting rod and an arm 162, one end of which floats on another vertical shaft 163. The control cam 155 is provided with a cam groove 164 in which a rotary rider 165 carried by the connecting rod is seated. The shape of the cam groove 164 is such as to move the connecting rod through a complete reciprocatory cycle for each revolution of the shaft 153, thus causing a swinging of the arm 162 about the shaft 163 as a center. The purpose of the spring 160 is to take up any looseness in the pivotal connections already described and later to be described so as to eliminate any undesirable effects of lost motion.

The free end of the oscillatable arm 162 is pivotally connected to a link 166 which is in turn pivotally connected to a slightly raised bracket portion 167 of a substantially sector-shaped member 168, which functions as a carrier for the gripping mechanism which engages and transports a blank. The rear portion of the carrier has substantially a kidney shape, as indicated at 169 and is provided with an elongated arcuate aperture 170 slidable relatively to the shaft 163. The forward portion of this sector carrier 168 is provided on its underside with a pair of arcuate bars 171—171 to provide in effect a T-slot for the reception of an arcuate track member 172 on which the carrier rides. This track is rigidly supported in position on an arm 173 (Figure 13) extending from the housing 151. It will therefore be seen that as the connecting rod 156 reciprocates, the carrier sector 168 must swing back and forth through an arc defined by the track member 172, and as the carrier sector so swings, the kidney-shaped rear portion of this sector must also swing relatively to the shaft 163 from the position seen in Figure 11 to the position seen in Figure 12 and back again, so that the carrier is in reality swinging through an arc about a center disposed quite a distance to the right of the shaft 163, as viewed in Figures 11 and 12.

On the outer portion of the sector carrier 168, a super-structure 174 is provided. A pair of fixed arms 175—175 extend from this superstructure and carry a clamping bar 176 on their underside. At the bases of the arms 175, a shaft 177 extends transversely through the superstructure and on each end thereof this shaft carries a clamping member 178 keyed to the shaft. The clamping members 178 each embodies a hub portion 179 engaged on the aforesaid shaft 177 and then extends downwardly and outwardly from the hub portion terminating in an upwardly facing clamping head 180 opposed to the clamping bar 176. The blank 1 to be transported to forming position is engaged between the heads 180—180 and the bar 176.

The lower clamping elements or jaws 178—178 drop downwardly away from the bar 176 for the reception of a blank, and then rise into gripping engagement with the blank against the bar 176. Actuation of these jaws 178 is by means of a gear or pinion 181 keyed to the aforesaid shaft 177, which pinion is driven by a gear 182 on another transverse shaft 183. The gear 182 is in turn actuated by a rack bar 184 which slides back and forth beneath the gear 182. The rear end of the rack bar 184 is bifurcated as indicated at 185 and carries a roller 186 between the furcations in position to be engaged by a control bar 187. One end of the control bar is bifurcated, as indicated at 188, and is pivoted to a bracket 189 extending from the housing 151. Substantially centrally thereof, the control bar carries a rotary cam rider 190 which rides over the outer surface of a cam 191 on the shaft 163. This cam has a humped portion 192 so as to pivot the bar 187 towards the clamping means during substantially half a revolution of the cam, and permit the bar to return during the other half-revolution. The shaft 163 to which the cam 191 is keyed is driven from the aforesaid driven gear 154 on the drive shaft 153 through an intermediate gear 193 and a gear 194 on the shaft 163. The driving gear 154 and the gear 194 are preferably of the same size so that each will rotate equally and in the same direction.

The rack bar 184 is urged rearwardly into contact with the pivotal control bar 187 by means of a coil spring 195 wrapped around the hub of one of the clamp arms 175. This spring 195 is preferably left-hand wound, with the ends turned at an angle to the coil of the spring, one end 196 being disposed to bear against the upper surface of the clamp arm 175, and the other end 197 extending beneath the pivotal clamping arm or jaw 178. Thus, the spring normally tends to maintain the clamping jaws 178—178 in clamping contact with the bar 176.

In operation, the final blank feeding mechanism is extremely simple and accurate. Starting with the showing in Figure 11, the clamping element is in position to pick up a blank resting on the aforesaid pivotal fingers 139, as also indicated clearly in Figure 4. The hump 192 of the cam 191 has just passed by the rider 190 on the control bar 187, thus permitting the spring 195 to close the jaws 178 against the bar 176, firmly gripping the blank. At this point, the rack bar 184 has been moved to its rearmost position. With the blank thus engaged in the clamping means, the cam 155 rotates to push the sector 168 carrying the clamping means along the track 172 to the position seen in Figure 12, thus carrying the blank along an arcuate path and delivering the blank edgewise to the forming position which, in this instance, is into engagement with a forming mandrel 198. As the mechanism is seen in Figure 12, the hump 192 on the cam 191 is in the process of forcing out the control bar 197 and thus moving the rack bar 184 inwardly to open the jaws 178 against the action of the spring 195 and release the blank. The jaws will remain open until the sector 168 has made its return trip over the track 172 to the position of Figure 11, when the jaws will again be closed on the next following blank and the process repeated.

It will be recalled that the blank 1, as seen in Figures 11 and 12, is reversed from the position seen in Figure 25, the latter being a bottom plan view of the blank. Consequently, the blank 1 in Figures 11 and 12 carries the adhesived area 6—7 on its underside, the area 6 being near the edge 5 of the blank. With reference now to Figure 4, it will be seen that the clamping elements, namely, the jaws 178, engage the blank in a region devoid of adhesive, and it will also be noted that the jaws 178—178 engage the blank on either side of one of the fingers 139. Immediately upon the clamping of the blank, with the parts as seen in Figure 11, the fingers 139 are pivoted downwardly so as to be out of the path of swing of the clamping means when the blank is delivered to the mandrel. These fingers again pivot upwardly to horizontal position, in the manner above described, after the clamping means has again returned to the position seen in Figure 11, but before the jaws have closed. At this instant, the pusher bars 120—120 advance the next following blank onto the fingers, the jaws immediately close, the fingers again drop, and the new blank is fed to the mandrel.

The intermediate blank feeding mechanism and the final blank feeding mechanism are so timed in their operation relative to each other that the above operations, including the engagement and feeding of a blank and the dropping and raising of the fingers 139, occur in almost one fluid-like motion. In other words, while the clamping means are returning with the jaws open, the fingers have started to rise, so in reality there is none but the slightest instant, if any, between the above described steps of the operation, thus providing for very rapid delivery of the blanks to the forming means.

A highly important feature of the present invention is embodied in the final blank feeding mechanism and the manner in which this mechanism delivers a blank to the forming mandrel. It will be noted that while the arcuate edges 2 and 3 of a blank 1 are of different radii, they are both struck around the same center. The edges 4 and 5 are preferably radial edges and, if extended to their meeting point, would intercept on the center of the arcs 2 and 3. The forming mandrel 198 is in the shape of a truncated cone and is preferably positioned so that if the axis of the mandrel and two diametrally opposed elements of the mandrel were extended to their meeting point, that point would coincide substantially with the center of curvature of the arcuate edges 2 and 3 of the blank. Likewise, the construction is preferably such that if the straight end edges of the raised portion 167 of the carrier sector 168 were extended to their meeting point, that meeting point would still be the center of the arcs 2 and 3. The same is true with the opposed arcuate edges of the track member 172, which arcuate edges are concentric with the arcuate edges of the blank when the blank is properly positioned to be picked up by the clamping means.

It will therefore be appreciated that the blank is swung to the mandrel along an arcuate path whose center is the center of the arcuate edges of the blank, and which center is also intersected by the axis of the forming mandrel and by an element of the forming mandrel. That theoretical center will, of course, be a distance to the right of the shaft 163, as viewed in Figures 11 and 12. Therefore, when the leading edge 4 of the blank reaches the mandrel, this edge will be exactly parallel to an element of the mandrel. In the present instance, as will more fully be later explained, the mandrel has an opening in the side thereof and internal gripping mechanism, and a portion of the edge 4 actually enters the mandrel. Consequently, it will be seen that it makes no difference if one blank is fed a fraction of an inch farther or a fraction of an inch less than another blank. In any and all events, when wound slightly over twice around the mandrel, the edges of the blank will be absolutely flush at both ends of the container body thus shaped. In other words, the winding of the blank must be a flush winding, and the edge of the inside lap will not project beyond or fall short of the edge of the outside lap at either end of the container body.

*The turret wheel and associated structure*

With reference more particularly to Figures 15, 16, 17 and 18, it will be seen that a plurality of mandrels 198, in this instance four, are carried by a rotatable turret wheel 199, the hub of which floats on a fixed shaft 200 extending transversely of the machine and carried by the aforesaid supporting spider 26 and the support 28 on the opposite side of the machine (Figures 15 and 16). As seen in Figures 16 and 17, the turret wheel is in the form of a large gear, the teeth being on the outer circumferential surface of the gear. The turret wheel 199 is continuously rotated, but at variable speeds, during the operation of the machine, and is driven from the aforesaid main drive shaft 29 by an arrangement now about to be described.

Outside of the hollow bed portion 18 of the frame construction and behind the gear 31, as viewed in Figure 15, the shaft 29 is provided with a drive gear 201 (Figure 17). This gear meshes with a similar gear 202 carried on an adjacent and parallel shaft 203. Inside the hollow bed 18, the shaft 203 carries another gear 204 which in turn meshes with a larger gear 205 on a shaft 206. Disposed out of alignment with the shaft 206, namely, to one side thereof, is another shaft 207 carrying a gear 208 which directly drives the turret wheel. The shaft 207 is driven by the shaft 206 through a variable speed drive arrangement including a disk 209 on the shaft 206 carrying a pair of parallel guide bars 210 rigidly secured to one surface of the disk on opposite sides of the center thereof to provide a guide groove 211 therebetween. Freely slidable in the groove 211 is a block 212 suitably apertured to freely journal a pin 213 eccentrically mounted on a disk 214 attached to the shaft 207. It will therefore be seen that the shaft 206 drives the shaft 207 and consequently rotates the turret wheel at a variable speed by virtue of this drive connection. For example, with the pin 213 disposed at substantially its maximum distance from the shaft 207, the shaft 207 and turret wheel will be driven at substantially its fastest speed, while when the pin 213 assumes a position closer to the shaft 207, by virtue of the sliding block 212, the turret wheel will rotate at a slower speed.

Attention is directed to the fact that the variable speed drive arrangement is shown in the position seen in Figures 16 and 17 for the purpose of clarity in illustration. Actually, the point of highest speed of the turret wheel occurs when a mandrel is midway of the arc between the points A and B in Figure 17, and the fastest speed will again occur when that same mandrel is midway between the points B and C, and so forth on through a complete revolution, the turret wheel passing through four complete speed cycles during a single revolution. In other words, in Figure 17, the turret wheel and mandrels are shown 45 degrees out of line with the showing of the variable speed drive.

The turret wheel 199 is provided, in this instance at 90 degree intervals with integral bearing formations 215 which not only journal the shafts to the respective mandrels 198 but also journal on the radially inward portions control means for the rim-rolling mechanism to bring the rim-rolling mechanism into play at the proper time to act upon the mouth end of a cup being formed upon a mandrel.

*The forming mandrels and associated mechanism*

Each of the bearing formations 215 and the radial outer parts thereof journal a mandrel spindle 216, on the outer end of which a mandrel 198 is keyed, as indicated at 217, to rotate with its spindle (Figure 19). Each mandrel is preferably of frusto-conical shape and has a slit or opening in its outer surface through which the edge portion of a delivered blank projects, as indicated in Figure 12. Inside the mandrel is a mechanical gripper arrangement including a gripper jaw 218 which mechanically grips the small margin of the blank entering the opening in the mandrel. The gripper jaw 218 is actuated by a hollow gripper control shaft 219 which extends through the hollow mandrel spindle 216, and inside the mandrel an actuating element 220 extends radially outwardly from the control shaft through a suitable opening 221 in the mandrel spindle. The actuator 220 is connected to the gripper jaw 218 so that when the control shaft 219 is rotated relatively to the mandrel spindle, the gripper jaw is caused to close upon a received blank and then open at the proper time to permit the discharge of a finished container.

In order to release a finished container from the mandrel after the gripper jaw 218 has been moved to open position, a release ring 222 is provided in the outer end of the mandrel, this release ring being grooved to accommodate spiral teeth 223 on a plug 224, the shank 225 of which extends within the mandrel spindle so as to be actuated by the control shaft 219. Upon a movement of the control shaft so as to open the gripper jaws 218, the release ring 222 is propelled outwardly beyond the end of the mandrel to cause a loosening of the finished container from the mandrel. As stated above, the control shaft 219 is hollow, as seen clearly in Figure 18, and the end of the shaft opposite the mandrel may be connected to a compressed air tube 226 (Figure 16), which tube may be connected to any suitable source of compressed air and equipped with suitable valve means to provide a blast of air through the control shaft 219 and openings in the forward part of the mandrel (not visible in the drawings) and thus expel a finished container from the mandrel. With reference to Figure 17, the finished container is forcibly expelled from the mandrel by a blast of compressed air when the mandrel is in position D of its translatory path defined by its position on the continuously rotating turret wheel 199.

With reference to Figures 16 and 18, it will be seen that the mandrel spindle, and consequently the mandrel, do not rotate about their own common axis during the entire course of travel in a revolution of the turret wheel. Inside the turret wheel housing 27, a mutilated or half-ring gear 227 is mounted in fixed position to be engaged by a gear 228 fixed to the mandrel spindle. Consequently, the mandrel is rotated about its own axis from cup-discharge position D through blank-pickup position A to position B, but the mandrel then remains fixed relatively to its own axis, while the turret wheel carries it from position B through position C back to position D, by virtue of a block 229 carried on the mandrel spindle behind the gear 228 riding the inner edge of a half-ring 230 also fixedly secured in the turret wheel housing 27. This block 229 (Figure 18) is not round, but is substantially oblong in shape having a contacting surface slightly arcuate, complemental to the inside surface of the half-ring 230, so that the mandrel is effectively prevented from rotating during that half revolution of the turret wheel.

For purposes of clarity, the turret wheel and mandrel actions relative to other mechanisms will be explained at this point. At position D of a mandrel on the turret wheel, the finished container is ejected. In the showing in Figure 17, that particular mandrel having just ejected a container is carried by the turret wheel from position D to position A, traveling counter-clockwise, while in Figure 18, which is a view from the opposite side of the turret wheel, the same mandrel travels from position D to position A in a clockwise direction. As the mandrel leaves position D, the gear 228 on the mandrel spindle engages the half-ring gear 227 in the turret wheel housing, and the mandrel is rotated around its own axis as well as bodily carried by the turret wheel. During its travel from position D to position A, the mandrel passes through a complete speed cycle of rotation about its own axis, owing to the variable speed travel of the turret wheel, and arrives at position A at the slowest part of the speed cycle, in position to pick up a new blank. Between position A and position B, the mandrel again passes through a speed cycle and winds the blank twice around itself. The blank is fully wound around the mandrel into a double-walled container body when position B is reached, and there the mandrel ceases rotating about its own axis.

During the travel of the mandrel from just beyond point B to somewhat beyond point C, the rim-beading and grooving mechanism acts upon the mouth end of the container being formed, and the bottom-finishing mechanism contemporaneously and simultaneously acts to complete the bottom end of the container. During the forming of the container, the body portion is ironed to better set the adhesive in a manner to be later described until just before point D is reached, at which point the container is ejected from the mandrel. The ironing of the body portion of the container begins almost with the reception of the blank at point A and continues until point D or the discharge point is almost reached.

From the above description, it will be apparent that the mechanical gripper mechanism contained within the mandrel must open substantially at the time point D is reached and must close upon a blank received at point A, the closing of the gripping mechanism at or near point A occurring while the mandrel is rotating about its own axis, but at the slower part of the speed cycle. The gripper actuating mechanism for causing a rotation of the control shaft 219 relatively to the mandrel spindle 216 is best seen in Figure 18.

On the rear end of the hollow mandrel spindle 216 is a disk 231 having a notch 232 therein. This disk carries an arm 233 pivoted to the disk on one side thereof near one end of the arm, the free end of the arm being disposed opposite the notch 232 and having a pin extending through the notch on the opposite side of the disk 231. A spring 234 is connected at one end to the free end of the arm and at the other end to the disk proper, tending to pull the free end of the arm inwardly towards the central portion of the disk. The control shaft 219 extending through the mandrel spindle carries a crank arm 235 and a pair of angularly disposed arms 236 and 237 to the rear of the disk 231, which arms as well as the crank arm 235 are keyed to the control shaft 219. As stated above, when a mandrel reaches position D, the gripper inside the mandrel must release the inside marginal portion of the finished container to permit the ejection of the container. With reference to Figure 18, the upper mandrel is in position for ejection of a container, the grippers of the mandrel being in open position, and the arm 236 having been turned counter-clockwise by passing beneath the stationary finger 238 which contacted the arm 236 sufficiently to rotate the control shaft 219 relatively to the mandrel spindle and thus opened the grippers in the mandrel. Such rotation causes the crank arm 235 to seat beneath a roller 239 carried by the pivotal arm 233 and force the free portion of this arm outwardly against the action of the spring 234.

The grippers remain in open position during the translatory movement of the mandrel arrangement to substantially position A. During the travel from position D to position A, the mandrel arrangement is rotating counter-clockwise about its own axis, due to the engagement of the gear 228 with the half-ring gear 227. Substantially at point A, the arm 237 on the control shaft 219 is brought into engagement with a stationary cam element 240, causing a rotation of the control shaft 219 relatively to the mandrel spindle sufficiently to close the grippers in the mandrel. This rotation of the shaft 219 causes the crank arm 235 to move out from under the wheel 239, permitting the spring 234 to draw in the free end of the arm 233. Thus, it will be seen that a spring-controlled snap action is provided for the closing of the grippers, and the holding in of the arm 233 so that the wheel 239 resting alongside of the crank arm 235 effectively prevents any accidental opening or loosening of the grippers. The grippers remain in closed position from point D until the arm 236 contacts the aforesaid stationary finger 238 and causes an opening of the gripper.

As the mandrel picks up a blank at point A and winds the blank around itself as it travels from point A to point B and then is non-rotatably carried from point B to nearly point D, the blank is constantly in contact with a stationary ironing arrangement which causes a tensioning of the body of the blank while it is wound around the mandrel and then serves to maintain this tension and iron the rolled body portion over the side seam thereof during the movement of the mandrel from point B nearly to point D. This ironing arrangement includes a spider 241 fixed to the stationary supporting shaft 200 and carrying an arcuate rim 242 (Figures 16 and 17). On the outer face of the rim is a cushioning medium 243 which may be felt, sponge rubber, or some equivalent material. Preferably, the cushioning element is faced with a smooth surfacing element 244 which may be in the nature of a smooth steel or copper strip. The ironing element extends from point A around to nearly point D, the mandrel in effect contacting this element and pressing the blank thereagainst when the blank is picked up at station A, and the mandrel leaving the element just prior to reaching discharge position D.

*The rim rolling mechanism*

The mechanism for providing the rolled rim bead 13 and the annular groove 14 just inside of the rim bead on the finished container, as seen in Figure 27, is best seen in Figures 16 and 19. In the present instance, a separate mechanism for this purpose is provided on the spindle of each mandrel and on the turret wheel to one side of the mandrel spindle.

Before the rim bead 13 can be rolled and the internal groove 14 provided, it is necessary to have backing means outside of that portion of the cup body projecting beyond the rear end of the mandrel. To this end, a pair of clamping shoes 245 are disposed diametrally opposite each other relatively to the mandrel. Each of these clamping shoes is provided with substantially a semi-circular recess 246 (Figure 17) so that when the shoes are brought together, as seen in Figure 19 and at points B and C in Figure 17, the shoes completely embrace the rear end of the mandrel and that portion of the container body extending beyond the mandrel. Each of the shoes 245 is attached to the end of an arm 247, the other end of which is bifurcated and pivoted as at 248 to a journal boss 249 integral with the aforesaid bearing formation 215 on the turret wheel. On one side of each arm 247 is an inwardly turned lug 250, which lugs are connected by a transversely extending tension spring 251 tending to hold the shoes 245 clamped around the mandrel. On the opposite side of each arm is another depending lug 252 carrying a roller 253 which rides over the surface of a cam plate 254 having a series of cam steps 255, 256 and 257. When this cam plate is moved in a manner to be later described so that the steps 255 are between the rollers 253, the arms 247 together with the shoes 245 are forced apart to the open position seen at points D and A in Figure 17, against the action of the spring 251. When the cam plate is moved to the right as seen in Figure 19 so that the rollers 253 are in the intermediate steps 256, the shoes are in closed position but not yet under full spring tension, which occurs when the cam plate is moved further to the right and the rollers occupy the steps 257, thus leaving the spring 251 free to exert full tension towards keeping the clamping shoes closed.

In order to aid in providing the desired formation at the mouth end of the container, the clamping shoes are provided with an internal groove 258 in their clamping faces to form an outside die for the groove 15 in the container wall, and also with an annular groove 259 in their inside faces to act as a half-die for the rim bead 13.

The rim rolling unit is slidably disposed on an inner enlarged portion 260 of the mandrel spindle 216 and includes a sleeve 261 to which is fixed the inner portion of an annular ball race 262. The outer part of the ball race is attached to a pulley member 263, the pulley being rotatable on the ball race relatively to the sleeve 261 and the mandrel spindle 216. This pulley carries a rim-beading ring 264 which is fixedly attached to the pulley and includes an inclined surface 265 for entry into the mouth end of the container body in keeping with the taper of the body, and above this surface the ring is provided with an annular groove 266 to act in conjunction with the groove 259 in the clamping shoes and thus provide a die socket for the formation of the rim bead 13 on the container. Seated in a suitable socket in the ring 264 is a cam ring 267 which is cut away at one point to provide a tapering cam surface 268. Outward of the cam ring 267 is a groove-spinning ring 269 having a central opening 270 larger than the shank portion of the mandrel top 271. Integral with the spinning ring 269 is a block portion 272 which rides the cam surface 268 to skew the ring in that direction and force the projecting portion 273 of a spinning die carried by the ring radially outwardly beyond the tapering portion 265 of the beading ring 264. The groove spinner 269 is normally forced axially outwardly beyond the ring 264 by means of a spring 274 carried in a socket of the cam ring 267 and bearing against the groove spinner. The cam ring also has an obliquely disposed cam groove 275 therein in which a rider 276 integral with the groove spinner 269 is disposed.

As the entire structure, including the sleeve 261, pulley 263 and all parts carried thereby, moves forwardly towards the mandrel head 271, the groove spinner 269 first contacts the mandrel head, and as the remainder of the structure advances over the groove spinner, it is forced outwardly at one point by the cam surface 268 so that the spinner element 273 projects beyond the ring 264 and forces the paper of the container body into the groove 258 in the clamping shoes to provide the internal groove 14 in the finished container. While this groove is being spun, the pulley 263 together with all of the structure carried thereby is spinning at a high rate of speed relatively to the mandrel and the container body thereon. As the structure continues to advance towards the mandrel, the end margin of the container body follows the tapering surface 265 and enters the groove 266, where it is turned over in the form of the rim bead 13, the spinning die 273 seating in a notch 277 in the tapering portion of the bead spinning ring 264. As the sleeve 261 and pulley 263 are retracted away from the mandrel after the spinning operation, the spring 274 again forces the groove spinning ring 269 outwardly to the position seen in Figure 19.

The actuating means for periodically moving the spinning structure towards and away from the mandrel are best seen in Figure 16, with reference also to Figures 18 and 19. These means include a relatively large fixed cam 278 on the supporting shaft 200 behind the turret wheel. This cam 278 is provided with a cam groove 279 in which a rider 280 carried on the end of a shaft 281 is seated to follow the contour of the groove and thus cause a reciprocation of the shaft which is slidably disposed in a portion of the bearing formation 215 carried by the turret wheel. On the opposite end of the shaft 281 is a fixed arm 282, the free end of which is bifurcated or forked, as seen in Figure 19, to seat in a groove 283 provided in the aforesaid sleeve 261. The cam plate 254 which controls the opening and closing of the clamping jaws 245 is also reciprocated by the arm 282 and is carried on a shaft or rod 254a slidable in the bearing formation 215 between the shaft 281 and the mandrel spindle.

With reference to Figure 17, it will be seen that a pulley 284 and a similar pulley 285 disposed at the upper and lower ends of the turret wheel housing 27 provide a track for a rapidly and continuously moving belt 286 which is operated from any suitable source of power not shown in the drawings. As the turret wheel carries a mandrel from point A, through point B, approaching point C, the pulley 263 of the rim beading mechanism contacts the belt 286, as indicated in Figure 17, and is spun at a high speed by the belt. The belt is so disposed that the spinning of the pulley continues throughout the formation of the rim bead 13 and the internal groove 14 in the finished container. At the completion of these operations, the pulley is carried away from contact with the belt as the mandrel continues its translatory path.

Briefly, the operation of the rim forming mechanism is as follows: As the mandrel picks up a blank at point A and winds the blank around itself while traveling to point B, the rim forming mechanism and cam member 254 for the clamping jaws 245 are being gradually advanced towards the mandrel head by virtue of the rider 280 on the shaft 281 following the groove in the cam 278 as the turret wheel rotates. This advance has progressed sufficiently to cause a closing of the clamping jaws just as the winding of the blank about the mandrel has been completed, substantially at point B. As the mandrel travels beyond point B towards point C, the cam member 254 advances further and permits the rider 253 to drop upon the steps 257 (Figure 19), thus permitting full power of the spring 251 to be exerted upon the clamping jaws, holding the partially formed container tightly upon the mandrel. Contemporaneously therewith the pulley 263 contacts the rapidly moving belt 286 and begins to spin relatively to the sleeve 261, carrying with it the rim beading ring 264 and the groove forming ring 269. As this groove forming ring strikes the mandrel head, it begins to seat within the forward portion of the ring 264 against the action of the spring 274, and the grooving die 273 provides the internal groove 14 in the container. Contemporaneously, the outer marginal portion of the container is turned over by the tapering end 265 of the rim forming ring into the groove 266 to provide the bead 13 on the container. Immediately following the completion of these operations, the arm 282 is retracted by the stationary cam 278 to move the rim forming mechanism and cam plate 254 in a direction away from the mandrel head, the pulley 263 being carried away from the traveling belt at the same time. This motion continues until the clamping jaws 245 have been forced into open position by the cam plate 254, prior to the arrival of the mandrel at container discharging position D.

*The bottom blank cutting means*

The bottom blanks mentioned above in connection with Figures 27 and 28 are cut from a substantially continuous stock ribbon. These bottom blanks are punched from the stock ribbon as needed for delivery to each forming mandrel 198 as the mandrel reaches body blank pick-up position A or just prior thereto. The ribbon feeding mechanism and bottom blank punching mechanism are supported in part by a fixed supporting shaft 287 carried in suitable bosses 288 on the top of the turret wheel housing 27.

With reference to Figure 15, it will be seen that the stock ribbon from which the bottom blanks are cut (not shown in the drawings) is fed between a driven feed roll 289 and a spring-pressed idler feed roll 290 along a track 291 with which a guide bar 292 is associated. The feeding roll 289 is driven through a bevel gear connection 293 from a vertical shaft 294, which is in turn driven through a bevel gear connection 295 from a horizontally disposed shaft 296, in turn driven by a chain and sprocket connection 297 from the aforesaid intermediate drive shaft 32.

The track 291 curves downwardly to guide the stock strip between a pair of feed rolls carried on adjacently disposed shafts 298 and 299 journalled in a supporting bracket 300 (Figure 21) which is secured to both the main supporting shaft 200 and the upper supporting shaft 287. The roller on the shaft 298 may be thrown out of position for the purpose of feeding the stock strip between the rolls when necessary by a hand lever 301. The shaft 299 is driven through a pinion 302 carried by this shaft from a gear 303 on a shaft 304 journalled in the side of a punch housing 305 (Figure 20) carried by the aforesaid bracket 300. The gear 303 is intermittently driven from the continuously rotating main drive shaft 29. With reference now to Figure 15, it will be seen that a bevel gear connection 306 causes the main drive shaft 29 to drive a vertical shaft 307 which in turn, through a bevel gear connection 308 at the upper end thereof, drives a horizontally disposed shaft 309 carrying a cam 310 provided with a suitable cam groove 311. Seated in the cam groove 311 is a rotary rider 312 carried on the upper end of a rocker arm 313 intermediately pivoted as at 314 to a suitable frame construction. The lower end of the rocker arm is pivoted to one end of a link 315, of which the other end is pivoted to one end of a rocker arm 316 centrally pivoted on the shaft 304. The upper end of the rocker arm 316 carries a pawl 317 which engages with a ratchet wheel 318 keyed to the gear 303. As the roller 312 follows the cam groove 311, both rocker arms 313 and 316 are caused to rock in unison, and thus the pawl 317 is caused to intermittently rotate the gear 303 sufficiently to drive the pinion 302 and cause a sufficient feeding of the stock strip for the cutting of the next bottom blank by means now about to be described.

The bottom blank cutting means are best seen in Figures 15 and 20, with reference to Figure 21 for location of parts. When the bottom blank stock ribbon is advanced by the rolls on the shafts 298 and 299, the ribbon enters an opening or passage 319 through the aforesaid housing 305 behind a female die 320 which closes an end of the housing. This die member 320 has a socket 321 therein slightly less in diameter than the width of the passage 319 so as to provide an annular cutting shoulder 322 adjacent the passage 319. The die member 320 also is provided with a central opening 323 through which severed bottom blanks may be extruded.

Inside the housing 305, a compound die reciprocates. This compound die includes an outer hollow punch die 324 having a punching end 325 of a size to enter the recess 321 in the female die 320, and cooperate with the cutting shoulder 322 to sever a disk from the stock ribbon in the passage 319. At the opposite end thereof, the hollow punch die 324 is provided with a headed plug 326 threadedly engaged with the die body. The inner bore of this plug together with the intermediate portion of the die 324 provides a bearing surface for a reciprocating punch die 327 which may operate relatively to the hollow punch die 324. The punch die 327 forms the second part of the total compound die arrangement and includes a punching head 328 adapted to extend through the opening 323 in the female die member 320. The punch 327 is adapted to move in unison with the hollow punch 324 or relatively thereto, both of these punches advancing together for a part of their joint stroke, and then the punch 327 advancing beyond the punch 324.

The hollow punch 324 is actuated through a pair of links or pitmans 329, one of which is pivoted as indicated at 329a to either side of the plug 326. Each link is provided with an elongated slot 330 embracing the aforesaid vertical shaft 307 so that the links may move relatively to the shaft. On each side of this opening or slot 330, the link carries a rotary cam rider 331, between which riders is disposed a cam 332 keyed to the shaft 307. This cam is so shaped as to cause a reciprocatory cycle of the links 328 and the hollow punch 324, including a punching and return movement for each revolution of the shaft 307.

The inner punch 327 is also actuated from the shaft 307 by means of a link 333 pivoted at one end to a pair of ears 334 integral with the punch. As seen best in Figure 15, the other end of this link 333 is shaped in the form of a ring 335, within which ring is a cam 336 eccentrically associated with and keyed to the shaft 307 to be driven thereby.

Briefly, the operation of the bottom blank supply means includes the feeding of a stock ribbon along the track 291 downwardly between the rolls carried on the shafts 298 and 299. These feed rolls advance the strip intermittently by virtue of their drive connection with the gear 303, driven as above described, and each advance is sufficient for the cutting of another bottom blank. Contemporaneously with the arrival of the strip through the passage 319 in the housing 305, the compound punch mechanism is operated by the shaft 307 and the cams associated therewith to move both punches 324 and 327 forwardly towards the strip. The punch 324 arrives first and severs a disk from the strip, positioning this disk in the recess 321 of the female die member 320 closing the end of the housing. The inner punch 327 then projects beyond the punch 324, and the head 328 of this inner punch does not sever any portion of the disk already cut, but forces this disk through the opening 323 in the female die 320. This opening 323 is of slightly larger diameter than the punch head 328, and when the disk is forced through the opening by the punch head 328, the outer circumferential portion of the disk is bent back over the head 328 to provide the flange 9 seen in Figure 27, around which the lower marginal portion of the container body is turned to unite the body and bottom blanks.

Means are provided to deliver a flanged bottom blank when it is pushed through the opening 323 to a feeding mechanism which holds the bottom blank against the base of a mandrel 198 while the body blank is wound around the mandrel and the flange of the bottom blank. These bottom blank delivery means include an arm 337, one end of which is carried by a shaft 338 journalled in the aforesaid bracket 300. This shaft 338 also has affixed thereto a pinion 339 which is engaged by a rack 340 carried on a pitman 341 (Figure 21). The rack carrying end of the pitman is slotted, as indicated at 342, to ride freely over the shaft 338. The other end of the pitman is also slotted, as indicated at 343, to loosely embrace the aforesaid transverse shaft 309. The upper end of the pitman carries a rotary cam rider 344 engaged with a cam groove 345 of a cam 346 keyed to the shaft 309. With each revolution of the shaft 309 and the cam 346, the free end of the pitman 341 will make a reciprocatory cycle, including a forward and back movement, thereby causing the arm 337 through the rack and pinion connection to swing upwardly from the position seen in Figure 21 to a position opposite the opening 323 and back again.

The outer or free end of the arm 337 embodies a pair of tongs 347 and 348, of which the tong 347 is preferably intergral with the body portion of the arm. The tong 348 is pivoted to the arm as indicated at 349 behind a stop shoulder 350, and a leaf spring or the equivalent 351 urges this tong against the stop shoulder in closed position.

In operation, the arm 337 rises so that the tong members 347 and 348 are opposite the opening 323 contemporaneously with or just prior to the time a flanged bottom blank is forced through this opening by the head of the die 327. The die pushes the flanged blank directly between the tong members 347 and 348 which then carry the blank to the position seen in Figure 21, where a bottom positioning member to be later described pushes the blank out of the tong members against the base of a mandrel 198, substantially at point A of the translatory path of the mandrel.

*The bottom finishing devices and actuating means therefor*

In this instance, the bottom finishing mechanisms are three in number, namely, a bottom feeding and holding unit, a crimping unit, and an ironing unit, generally indicated by numerals 352, 353 and 354 respectively in Figure 21. All three bottom units or devices preferably operate simultaneously, each on a separate container being formed on a different mandrel 198. The bottom devices are moved axially towards the respective mandrels, then the units travel simultaneously through an arc in keeping with the translatory path of the mandrels, then move back in an axial direction away from the mandrels, and then return in an arcuate path in time to engage the next three mandrels, two of which latter three mandrels have already been acted upon by different units. In other words, one mandrel traveling its translatory path established by the turret wheel will first have associated with it the device 352 at point A; then at point B, it will be acted upon by the device 353, and then at point C, it will be acted upon by the final finishing and ironing device 354, each finishing device traveling the translatory path with the mandrel until its work is finished, then leaving the mandrel and returning to its original position in time to act upon the following mandrel.

The arcuate travel of the bottom devices is effected by a rocking spider 355 floating on the stationary supporting shaft 200, as seen in Figures 16 and 21. The rocking spider 355 is provided with three legs 356, 357 and 358, in each of which one of the bottom finishing devices is journalled for reciprocatory sliding movement, these legs journaling the devices 352, 353 and 354 respectively. Also carried by the stationary shaft 200 is a pusher spider 359 having legs in similar formation to that of the rocking spider and each leg supporting an end of the shaft of one of the finishing devices, as seen clearly in Figures 1 and 16. One or more guide shafts, such as the shaft 360, are also disposed between the two spiders to better stabilize the construction.

The pusher spider 359 includes a hub portion 361 engaging the shaft 200 and rotatable relatively thereto, and an outer sleeve portion 362, there being a ball race 363 to permit relative rotation between the hub and the sleeve. Thus, the spider 359 may rotate along with the rocking spider 355 but relatively to the sleeve 362 which is held against rotation by the pusher mechanism now about to be described.

The mechanism for pushing the spider 359 back and forth along the shaft 200 includes a cam 364 keyed to the aforesaid drive shaft 206 in the hollow bed portion 18 of the frame. This cam is provided with a suitable groove 365 in the side surface thereof which accommodates a rotary cam rider 366 journalled in the lower end of a vertical bar 367. As seen best in Figure 21, the cam groove 365 is arranged to vertically reciprocate the bar, the bar remaining in its upper position for substantially a half turn of the cam, and remaining in its lower position for substantially the other half turn, so that the bar makes a reciprocatory cycle with each revolution of the shaft 206.

At the upper end thereof, the bar 367 is shaped to journal a transverse pivot shaft 368, to each end of which one end of a link 369 is attached. The other end of each link 369 is pivoted as at 370 to an intermediate point of a link 371, which link is pivoted at one end to the upper part of the support 28, as indicated at 372, and at the other end to another link 373, as indicated at 374. The opposite end of the link 373 is pivotally connected to the aforesaid sleeve 362, as indicated at 375. From the showing in Figure 16, it will be seen that the links 371 and 373 are of such length as normally to be both upwardly inclined. In this figure, the cam rider 366 is shown in the high part of the cam groove 365, so that the bar 367 is in its high position, thus holding the spider 359 away from the spider 355 the maximum distance and thus keeping the bottom finishing devices spaced from the forming mandrels. However, when the rider 366 reaches the low portion of the cam groove 365, the bar 367 will descend from the high position seen in Figure 16 and thus through the links 369 tend to straighten out the inclination of the links 371 and 373, thus forcing the spider 359 towards the spider 355 and axially pushing each of the finishing devices into contact with the containers being formed on the respective mandrels. For purposes of better stability, one or more sliding guide rods 376 may be attached to the sleeve 362 for slidable engagement in suitable apertures in the supporting element 28.

The same control cam 364 on the shaft 206 also causes a rocking movement of the spider 355 carrying the bottom finishing devices 352, 353 and 354. With reference to Figures 16 and 21, it will be seen that this cam 364 has another cam groove 377 in the side face opposite to that having the groove 365. A crank arm 378 has one end connected to a sleeve 379 on a pivot shaft 380, and the free end of this crank arm carries a rotary rider 381 seated in the cam groove 377. Also rigidly connected to or integral with the sleeve 379 is another crank arm 382 which is disposed at an angle to the crank arm 378 (Figure 21). The free end of this crank arm 382 is pivoted as at 383 to one end of a link 384, the other end of which is pivoted as at 385 to a projecting portion of the leg 357 of the spider 355.

Consequently, as the crank arm 378 is swung backward and forward by virtue of the cam groove 377, the other crank arm 382 is likewise moved backward and forward about the shaft 380, thus causing a rocking movement of the entire spider 355 and a swinging back and forth through an arcuate path of each of the bottom finishing devices 352, 353 and 354. With reference to Figure 21, it will be seen that the cam groove 377 has a relatively short stop portion 386 therein to cause a slight hesitation of each of the finishing devices when they are in the position substantially as seen in Figure 21, namely, in keeping with points A, B and C of the translatory path of the mandrels. This slight hesitation at this point is to insure adequate contact with the containers being formed on the mandrels by the bottom finishing devices, which at this time are moved forward into contact with the containers by the pusher spider 359 in the manner above explained.

The bottom finishing devices 352, 353 and 354 are illustrated in detail in Figures 22, 23 and 24 respectively. With reference to Figure 22, it will be seen that the bottom blank positioning and holding device 352 includes a shaft 387 slidable in a suitable bearing 388 formed on the end of the rocking spider leg 356. One end of this shaft is of slightly reduced diameter and is threadedly engaged, as indicated at 389, with a locking bushing 390 fixed to one of the legs of the pusher spider 359. The other end of the shaft 387 is provided with an internal bore 391, in which a shaft 392 may reciprocate, being normally pressed outwardly by a compression spring 393 seated at the bottom of the bore. Reciprocal movement of the shaft 392 is limited by a stop pin 394 extending between the shoulders formed at each end of a portion of reduced diameter 395. Beyond the shaft 387, the shaft 392 is pinned to a cup-like head 396 containing a plurality, in this instance four, presser members 397, the base portion 398 of each of which is turned inwardly behind the face of a conical head 399 on the shaft 392. A circumscribing spring 400 tends to hold the presser members more or less centrally contracted, there being room for a slight relative pivotal movement of each member when pressure is applied against the action of the spring 400, tending to move the members radially outwardly.

When the device is moved towards a mandrel, the presser members 397 are in fully contracted position and engage inside of a flanged bottom blank 8 held by the aforesaid tong members 347 and 348 on the swingable arm 337. The presser members enter inside the flange 9 on the bottom blank and carry it forwardly out of the tong members against the base of a mandrel 198, the spring 393 providing a resilient yet positive pressure for this purpose. The device remains in position, holding the blank 8 against the base of the mandrel until the body blank 1 has been wound at least once around the mandrel and the flange of the bottom blank, that portion 7 of the glue area carried by the body blank 1 adhering to the outside surface of the flange of the bottom blank to establish the first part of the union between the body and bottom blanks. It will be noted that the shaft 392 with the head 396 may rotate relatively to the shaft 387, since the mandrel is rotating about its own axis during the time the holding device 352 is in operation on the container being formed. It will also be noted that the presser members 397 have relatively thin outer edges to seat snugly in the angle between the bottom 8 and flange 9 to insure a tight joint between the body and bottom blanks.

While the bottom holding unit 352 is acting upon a container being formed on one mandrel 198, the crimping device 353 is acting upon a container on another mandrel. With reference to Figure 23, it will be seen that the crimping device 353 includes a shaft 401 reciprocable in a bearing 402 formed on the ends of the rocking spider legs 357. One end of this shaft is threadedly engaged as at 403 to a locking bushing 404 fixedly carried by a leg of the pusher spider 359. As indicated at 405, a set screw element is used to lock the shaft 401 against rotation upon its own axis, the end of the set screw projecting into a suitable slot 406 to permit adequate reciprocatory movement of the shaft 401. The other end of the shaft 401 is bored to receive the solid shank portion 407 of a crimper support 408 which also includes a hollow shaft portion 409 having a slot 410 in the wall thereof. In the hollow shaft portion 409 is the shank of a central presser head 411, which shank is pinned, as indicated at 412, to a crimper backing member 413, the pin being slidable in the slot 410. This backing member 413 is provided with a solid annular nose 414 for engaging the outside of the container wall, the inner portion of the nose being shaped in the form of an arc 415 which turns inwardly the lower portion of the container body when the backing member 413 is brought into forcible contact with the container body. The backing member is provided with numerous slots 416, in each of which is slidably disposed a crimping bar or blade 417 integral with the holder portion 408. Each blade has a nose 418 designed to turn upwardly the inwardly bent margin of the body portion of the container so that this margin embraces the flange 9 on the bottom blank 8.

The entire backing member 413, together with the head 411, is urged forwardly by a coil spring 419 bearing against the backing member and against a fixed flange 420 disposed between the backing member and the end of the shaft 401. When the crimping device is out of contact with a container on a mandrel, the backing member 413, together with the central head 411, are held forwardly by the spring 419 so that the pin 412 is against the opposite end of the slot 410 from the showing in Figure 23. When the device is moved into contact with a container on a forming mandrel, as seen in Figure 22, the nose portion 414 of the backing member 413 will first contact the outer body wall portion of the container, contemporaneously with the seating of the head 411 against the central part of the bottom blank. As the backing member advances, axially of the mandrel, the lower marginal portion of the container body will follow the arcuate formation 415 and turn inwardly. As the shaft 401 continues to advance towards the mandrel, the crimper holder 408, together with the crimper blade 417, will be advanced against the action of the spring 419 and move forward inside of the backing member 413, the nose portions 418 of the crimper blades engaging the inwardly turned marginal portion of the container body and folding it upwardly around the flange 9 of the bottom blank, as seen in Figure 23.

After the bottom portion of the container has been crimped as above described, the mandrel is carried forward by the turret wheel, and the container is next acted upon by the finishing and ironing device 354 shown in detail in Figure 24. This device includes a shaft 421, the outer end of which is keyed, as indicated at 422, to permit free rotation in a fixed plug 423 threadedly engaged in a locking bushing 424 fixed to one leg of the pusher spider 359. Around the shaft 421 is a hollow shaft 425, part of which is shown broken away, and which may both reciprocate and rotate within a bearing 426 carried on the leg 358 of the rocking spider 355. The outer end of this shaft is threadedly engaged in a nut 427 which is also movable with the shaft relatively to the bearing. A spring 428 seated in the locking bushing 424 normally urges the shaft 425 forwardly towards a mandrel relatively to the shaft 421. As indicated at 429, the shafts 421 and 425 are pinned together, the pin passing through an elongated slot 430 in the shaft 421 to permit relative axial movement of these shafts.

At the forward end thereof, the hollow shaft 425 is provided with an outstanding flange 431 to which is bolted an inside annular collar member 432 seated over the inner end of the shaft. This collar member is provided with several slots 433, in this instance four, in each of which is seated a dog 434 pivoted at one end to a pivot pin 435. This dog may pivot back and forth within the slot 433 on the pivot pin. The dog is provided with a sloping wall 436 which functions as a cam surface to govern the pivotal movement of the dog, and the outer end of the dog is provided with an arcuate ironing element 437 for ironing the inner side of the folded body margin of the container, as seen in Figure 24. As indicated at 438, the inner end of the shaft 425 is also provided with several slots 438, in each of which one of the dogs is free for pivotal movement. Freely seated in a suitable notch in the end of the shaft 421 is a ball 439 which simultaneously rides the surfaces 436 of all of the dogs 434. As this ball is moved towards the mandrel, it pivots each dog outwardly against the action of a spring 440 seated in a recess in the dog and held in place by a holding ring 441. Between the collar member 432 and a fixed head 442 which surrounds the collar member is a ball race 443 to permit relative rotation of the collar together with the dogs carried thereby. The head 442 has a nose portion 444 for embracing the outside lower portion of the container body and functioning as a backing base for the ironing action of the dog heads 437. The head 442 is held in fixed position by a bracket 445 through which a bar 446 is slidable, this bar being bolted to the bearing member 426.

In order to insure rotation at the proper time of both shafts 421 and 425, a pinion 447 is provided on the shaft 425, the pinion having spline keys seated in one or more spline grooves 448 in the shaft 425. The pinion is held in fixed axial position with respect to the shaft by a flange 449 also bolted to the bar 446. During the rocking movement of the spider 355, the device 354 will be carried along an arcuate path, and the pinion 447 will be in engagement with a rack sector 450 which is bolted or otherwise secured to a plate 451 fixedly attached to the stationary shaft 200 (Figure 21). As the device 354 is carried by the sector rack 450, the shaft 425 is rotated at a high rate of speed by the pinion 447, and the shaft 421 is rotated at an equal speed by virtue of the pin connection 429.

As the ironing element 354 is seen in Figure 24, it is in operative contact with the container. Assuming now that the work of the ironing element is completed upon the particular container, the pusher spider is retracted, drawing back first the shaft 421, the spring 428 holding the shaft 425 together with the ironing apparatus in position until the opposite end of the slot 430 contacts the pin 429. This pulling back of the shaft 421 releases the ball 439 and permits the springs 440 to move the dogs 434 inwardly out of contact with the inside margin of the container bottom, after which the entire ironing structure will be withdrawn. When the next mandrel reaches position, the pusher spider 359 will again move the ironing apparatus into position to work on the container carried by that mandrel. The head 442, and especially the nose 444 thereof, will first contact the outside of the container, the dogs being at their innermost position and disposed loosely inside the turned-up lower margin of the container wall. As the pusher spider 359 continues to advance, the shaft 421 will move forward relatively to the shaft 425 and force the ball between the dogs, thus moving them out into ironing position. At about this time, the pinion 447 makes contact with the teeth on the sector rack 450, thus spinning the ironing dogs at the high rate of speed, while the head 442 remains stationary. This operation insures a positive bond between the container wall and the flange on the bottom member by virtue of a portion of the part 7 of the adhesived area, and an ironing of the turned-in body portion to provide a firm union and give a pleasing appearance.

*The operation of the machine*

Since the operation of the various component parts of the machine has been hereinabove described in connection with the description of those component parts, a general summary of the operation of the entire machine is all that is now necesary.

Blanks of the shape seen in Figure 25 are stacked in the magazine 35 and then fed out one at a time by means of the feeding pads 55 and the rolls 44 and 45 in the opposite direction to their ultimate travel. The blank is permitted to fall on the bed plate 21, where it is engaged by lugs 61—61 on the conveyor belts 60—60, and intermittently advanced, with the shorter arcuate edge foremost, to the gluing means. The glue pad 76 on the roll 74, after having been supplied with adhesive by the delivery roll 89, contacts the underside of the blank opposite the backing roll 77 and applies to the underside of the blank the adhesive area 6—7 shown in Figure 25. The backing roll together with the pad 76 then advances the blank forwardly onto the stationary fingers 116.

In the event, for any reason, a blank does not reach the continuously operating gluing mechanism at the time the pad 76 arrives opposite the roll 77, the trigger 98 will not be tripped and the pitmans 105—105 will actuate the raising mechanism through the pawl 103 to elevate the backing roll 77 away from contact with the glue pad. If a blank does pass, the trigger 98 will be tripped, and no elevation of the backing roll 77 will occur.

After the blank reaches the fingers 116, it is engaged by the elements 119 on the pusher bars 120—120 and further advanced to the pivotally mounted fingers 139. The blank is then engaged on a non-adhesive area by the clamping members 176 and 178 of the final feeding mechanism. Contemporaneously with the engagement of the blank, the fingers 139 are pivoted downwardly out of the way of the arcuate swing of the clamping device. This final feeding mechanism, including the clamping device, then carries the blank along an arcuate path about a center which is preferably the center of both arcuate edges of the blank, and which center is preferably intersected by the axis as well as opposed side elements of a truncated conical forming mandrel to which the blank is fed. It will be noted therefore that the blank, which is utlimately wound twice around the mandrel to provide a double-walled container, will always be wound with the edges of the inner lap flush with the edges of the outer lap, regardless of whether a blank is fed a trifle farther than another blank.

A plurality of such mandrels are mounted on a turret wheel, each mandrel bodily following a translatory path by virtue of the continuous rotation of the turret wheel. For substantially half the translatory path, the mandrel is also rotated about its own axis, the speed of rotation of the mandrel and also of the turret wheel being varied through speed cycles due to a variable speed drive for the turret wheel. When the body blank reaches the mandrel, a narrow margin adjacent the edge of the blank enters a slot in the mandrel and is clamped by internal gripping mechanism. While the blank 1 is being thus fed to the forming mandrel, the stock ribbon is also being fed along the track 291 into the path of the compound punch die, including the outer die 324 and the inner die 327, which acts to punch out a bottom blank and place the flange on the bottom blank and seat the flanged bottom blank in the tong members on the oscillatable arm 337, which in turn delivers the bottom blank in position in front of the bottom blank positioning and holding element 352. When this element is moved forward by virtue of the pusher spider 359, it takes the bottom blank from the tong members and seats it against the base of a mandrel 198. The feeding of the bottom blank and the reception of the body blank are contemporaneous and occur at the slower part of the speed cycle of the turret wheel, so that the mandrel is also at this time turning about its axis at the slower part of the speed cycle, substantially at point A along the translatory path.

By virtue of the rocking spider 355, to one leg of which the positioning and holding element 352 is attached, this element 352 travels along with the mandrel until the body blank has been wound about the mandrel and also about the flange on the bottom blank. Then the element 352 is retracted and goes back to its original position, and the same container being formed is acted upon by the crimping element 353 which contacts the container substantially at point B and also follows it along through an arcuate path until the crimping operation is completed, when it is retracted and assumes original position. The container is next subjected substantially at point C to the action of the bottom finishing and ironing device 354 which is rotated at high speed during its operation by the sector rack 450.

The mandrel ceases rotating about its own axis substantially at point D, and the crimping device 353 and finishing and ironing device 354 act upon the container while the mandrel is held against rotation. As the mandrel ceases rotating, the clamping shoes 245 are closed upon the large end of the mandrel about the container body, and the rim beading mechanism moves forward to provide the internal groove 14 and roll the rim bead 13 on the container. This mechanism reaches the mouth end of the container contemporaneously with the time when the crimping mechanism ceases to operate, and at that time the pulley 263 of the rim beading mechanism contacts the continuously moving belt 286 which spins the rim rolling mechanism so as to provide a neat finished appearance on the container.

After the mandrel passes beyond the belt 286, and the rim rolling mechanism and the bottom finishing device 354 have been withdrawn from association with the mandrel, the clamping shoes 245 are opened, and the container is expelled from the mandrel in the manner above described at point D, being discharged into a receiving chute 452 (Figure 1) in stacked nested relationship with previously formed containers.

It will be appreciated, of course, that while the bottom positioning and holding device 352 is acting on one container, the crimping device is simultaneously acting on the next preceding container, and the bottom finishing device 354 is acting simultaneously on the second preceding container. In this manner, containers are being continuously ejected from the mandrels on the turret wheel as point D is reached. After a mandrel leaves point D, it is again rotated about its own axis so as to bring the slot in the mandrel in register at point A for the reception of a new body blank. Thus the operation is continuous and consistent with very rapid and economical production.

From the early discussion of the method in general and the later description of the operations of the various component parts of the machine, it is believed that my novel method of making a container need not be further explained herein.

It will, of course, be understood that numerous details of construction may be varied through a wide range without departing from the principles of this invention, and it is therefore not the purpose to limit the patent granted hereon otherwise than is necessitated by the scope of the appended claims.

I claim as my invention:

1. In a container forming machine, feeding means to advance a blank along a predetermined path, gluing means arranged to apply glue over substantially half the surface of one side of said blank, a forming mandrel, other feeding means arranged to feed the blank along an arcuate path to said mandrel, and means to rotate said mandrel to wind the blank twice around the mandrel to provide a double-walled container with the outer wall glued to the inner wall.

2. In a container making machine, a forming mandrel of the general shape of truncated cone, feeding means arranged to advance a blank having an arcuate edge directly to said mandrel along an arcuate path the circumference of which is defined by said arcuate edge, means to rotate said mandrel sufficiently to wind said blank twice around the mandrel to form a double-walled container body, and ironing means positioned adjacent said mandrel to rub against said blank during the double winding of the blank tending to put a stretching tension on the blank as it is wound.

3. In a container making machine, a forming mandrel of the general shape of a truncated cone, feeding means arranged to advance a blank having an arcuate edge directly to said mandrel along an arcuate path the circumference of which is defined by said arcuate edge, means to rotate said mandrel sufficiently to wind said blank twice around the mandrel to form a double-walled container body, ironing means positioned adjacent said mandrel to rub against said blank during the double winding of the blank tending to put a stretching tension on the blank as it is wound, and finishing means arranged to simultaneously roll a rim bead on the mouth end of the wound container body and shape an internal groove in said body a predetermined distance inside the rim bead.

4. In a container making machine, conveyor means, blank pusher elements carried by said conveyor means, drive means for actuating said conveyor means, gluing means in the path of a blank carried by said conveyor means, forming means, and other feeding means arranged to advance the blank along an arcuate path to said forming means.

5. In a container making machine, intermittently operated feeding means, continuously operating gluing means in the path of said feeding means, pusher means to advance a blank beyond said gluing means, oscillatable feeding means to swing the glued blank through an arcuate path, and forming means at the end of said arcuate path to receive the blank and shape it into container form.

6. In a container making machine, feeding means for advancing a blank to be formed, combination gluing and feeding means arranged to receive a blank from the first said feeding means and apply an area of adhesive to the underside thereof and then advance the blank, a plurality of spaced relatively narrow fingers upon which the blank lies after leaving the gluing means, forming means, and other feeding means for advancing the blank from said fingers to the forming means.

7. In a container making machine, a bed plate, means for advancing a blank along said bed plate, gluing means adjacent an end of said bed plate to receive a blank therefrom and apply an area of adhesive to the blank, a plurality of spaced relatively narrow fingers to receive the blank from the gluing means, forming means, and feeding means to transfer the blanks from said fingers to said forming means.

8. In a container making machine, a bed plate, means for advancing a blank along said bed plate, gluing means adjacent an end of said bed plate to receive a blank therefrom and apply an area of adhesive to the blank, control means arranged to render said gluing means ineffective unless the control means are contacted by a passing blank, means especially constructed to provide a minimum of contact with the adhesive on the blank to receive a blank from the gluing means, forming means, and feeding means to advance the blank to the forming means.

9. In a container making machine, feeding means arranged to advance a blank, gluing means to apply adhesive to a fed blank, means to receive a blank from the gluing means and constructed to provide only spaced fine contacts with the adhesived area of the blank, pusher means to move the blank beyond the last said means, forming means, and other feeding means to advance a pushed blank to said forming means.

10. In a container making machine, feeding means arranged to advance a blank, gluing means to apply adhesive to a fed blank, means to receive a blank from the gluing means and constructed to provide only spaced fine contacts with the adhesived area of the blank, pusher means embodying a reciprocable rod carrying a blank-engaging shoe thereon to move the blank beyond the last said means, forming means, and other feeding means to advance a pushed blank to said forming means.

11. In a container making machine, gluing means arranged to apply adhesive to a traveling blank, pivoted supporting means, means to transfer a glued blank into said supporting means, forming means, and feeding means arranged to engage a blank on said supporting means and transfer it to said forming means, said supporting means pivoting out of the way of said feeding means contemporaneously with the engagement of said feeding means with the blank.

12. In a container making machine, pivoted supporting means including a plurality of spaced slender fingers to receive thereon an adhesived blank, forming means, and feeding means arranged to engage a blank between said fingers and advance it to said forming means at an angle to the direction of said fingers, said supporting means pivoting out of the way of said feeding means when the blank is engaged.

13. In a container making machine, pivoted supporting means including a plurality of spaced slender fingers to receive thereon an adhesived blank, forming means, and feeding means arranged to grasp a blank between said fingers and in a non-adhesived area of the blank and swing the blank at an angle to the direction of the fingers to said forming means, said fingers being pivoted out of the path of the feeding means.

14. In a container making machine, blank supporting means including a plurality of spaced movable slender fingers for holding an arcuate blank, forming means, and feeding means arranged to engage a blank between said fingers and move the blank to said forming means along an arcuate path about the center of curvature of the blank, said fingers being moved out of the said feeding means.

15. In a container making machine, a forming element, blank supporting means, a swingable carrier, said carrier having a slotted rear part to permit said carrier to move bodily and in effect turn about a center located beyond the confines of the carrier.

16. In a container making machine, a forming element, blank supporting means, a swingable carrier, a gripping means including clamping jaws, resilient means urging said jaws together, and means to actuate said jaws periodically to open them against the action of said resilient means for engaging and releasing a blank, and means to swing said carrier back and forth between said supporting means and said forming element to successively deliver blanks to said forming element.

17. In a container making machine, gluing means arranged to apply an area of adhesive to a blank, feeding means to advance a blank to said gluing means, control means to render said gluing means inoperable in the event said control means are not tripped by a passing blank, a set of widely spaced slender fingers to receive a glued blank, another set of similar fingers movably mounted, pusher means to advance the blank from the first set of fingers to the second said set, a track concentric with the arcuate blank as the blank rests on the second set of fingers, a carrier riding said track, gripping means on said carrier to grasp a blank between the fingers of said second set, means to move the second set of fingers out of the way of said carrier contemporaneously with the grasping of the blank, a forming element positioned so a prolongation of its axis will intersect the center of curvature of the blank and said track, means to move said carrier over said track to deliver a blank to the forming element, and means to rotate said forming element to wind the blank twice therearound to provide a double-walled container.

18. In a container making machine, a forming mandrel, feeding means to deliver a blank to said mandrel to be wound twice therearound into a double-walled container, and shaping mechanism brought into operation after the winding of the blank arranged to engage the mouth end of the wound blank and contemporaneously turn down a rim bead and provide an internal groove in the container wall inside the rim bead in a single operation on the container.

19. In a container making machine, a forming mandrel, feeding means to deliver a blank to said mandrel to be wound twice therearound into a double-walled container, shaping mechanism brough into operation after the winding of the blank arranged to engage the mouth end of the wound blank and contemporaneously turn down a rim bead and provide an internal groove in the container wall inside the rim bead in a single operation on the container, said mechanism including a unitary assembly slidable on the mandrel spindle, and means timed to move the assembly into cooperation with the end of the mandrel after the blank is wound.

20. In a container making machine, a forming mandrel, feeding means to deliver a blank to said mandrel to be wound twice therearound into a double-walled container, shaping mechanism brought into operation after the winding of the blank to engage the mouth end of the wound blank and contemporaneously turn down a rim bead and provide an internal groove in the container wall inside the rim bead, and clamping means engageable around the mandrel outside the wound blank prior to the operation of said shaping mechanism, said clamping means being grooved to form a backing die for the shaping of the rim bead and internal groove.

21. In a container making machine, a forming mandrel, feeding means to deliver a blank to said mandrel to be wound twice therearound into a double-walled container, shaping mechanism brought into operation after the winding of the blank to engage the mouth end of the wound blank and contemporaneously turn down a rim bead and provide an internal groove in the container wall inside the rim bead, said shaping mechanism including a rapidly rotatable rim beading die, a cam member attached to said die, a groove impressing die associated with said cam member, resilient means urging said groove impressing die outwardly away from said cam member into inoperative position until forced into operative position against the action of said resilient means by contact with said mandrel, and means for forcing said shaping mechanism into contact with the head of said mandrel after the winding of the blank.

22. In a container making machine, gluing means arranged to apply an area of adhesive to a blank, feeding means to advance a blank to said gluing means, control means to render said gluing means inoperable in the event said control means are not tripped by a passing blank, a set of widely spaced slender fingers to receive a glued blank, another set of similar fingers movably mounted, pusher means to advance the blank from the first set of fingers to the second said set, a track concentric with the arcuate blank as the blank rests on the second set of fingers, a carrier riding said track, gripping means on said carrier to grasp a blank between the fingers of said second set, means to move the second set of fingers out of the way of said carrier contemporaneously with the grasping of the blank, a forming element positioned so a prolongation of its axis will intersect the center of curvature of the blank and said track, means to move said carrier over said track to deliver a blank to the forming element, means to rotate said forming element to wind the blank twice therearound to provide a double-walled container, clamping means to engage around the mandrel outside of the wound blank and shaped to function as a backing die, a shaping assembly arranged to contemporaneously turn a rim bead on the wound blank and provide an internal groove inwardly of said bead while acting against the clamping means, and means to bring the shaping mechanism into operative association with the mandrel after the blank is wound.

23. The method of making a container, including the steps of providing an arcuate blank, feeding the blank to a forming location along an arcuate path about the center of curvature of the blank, forming the blank, and simultaneously forming an internal groove in the shaped blank and rolling a rim bead on an end portion thereof.

24. The method of making a container, including the steps of providing an elongated blank of which the longer sides are concentric arcs, feeding the blank along a predetermined path with one of said arcuate edges leading, applying adhesive to a side of said blank while it is following said path, grasping the blank bodily and swinging it individually and freely through an arcuate path about the center of said concentric arcs, and winding the blank twice around to form a double-walled container body.

25. The method of making a container, including the steps of shaping a blank into a container body, and then contemporaneously forming an inside groove in the body wall near the mouth end thereof and rolling a rim bead at the mouth end of the body in a single operation.

CESARE BARBIERI.